(12) United States Patent
Storey et al.

(10) Patent No.: US 11,795,247 B2
(45) Date of Patent: Oct. 24, 2023

(54) POLYOLEFIN DISPERSANTS AND METHODS OF MAKING AND USING THEREOF

(71) Applicant: The University of Southern Mississippi, Hattiesburg, MS (US)

(72) Inventors: Robson F. Storey, Hattiesburg, MS (US); Travis P. Holbrook, Hattiesburg, MS (US); C. Garrett Campbell, Albuquerque, NM (US); Georgeta Masson, Lafayette, CA (US)

(73) Assignee: The University of Southern Mississippi, Hattiesburg, MS (US)

( * ) Notice: Subject to any disclaimer, the term of this patent is extended or adjusted under 35 U.S.C. 154(b) by 0 days.

(21) Appl. No.: 17/125,708

(22) Filed: Dec. 17, 2020

(65) Prior Publication Data

US 2021/0189030 A1 Jun. 24, 2021

Related U.S. Application Data

(63) Continuation of application No. 16/134,474, filed on Sep. 18, 2018, now Pat. No. 10,875,946.
(Continued)

(51) Int. Cl.
*C08F 210/10* (2006.01)
*C08F 8/30* (2006.01)
(Continued)

(52) U.S. Cl.
CPC .......... *C08F 210/10* (2013.01); *C08F 8/30* (2013.01); *C08F 110/10* (2013.01);
(Continued)

(58) Field of Classification Search
CPC ...... C08F 110/10; C08F 8/30; C08F 2500/02; C08F 2500/03; C08F 4/16; C08F 210/10;
(Continued)

(56) References Cited

U.S. PATENT DOCUMENTS 3,278,550 A    10/1966  Norman et al.
3,366,569 A    1/1968   Norman et al.
(Continued)

FOREIGN PATENT DOCUMENTS

EP    0657475        6/1995
EP    0657475 A1 *   6/1995
(Continued)

OTHER PUBLICATIONS

Holbrook et al. "Synthesis, Characterization, and Evaluation of Polyisobutylene-Based Imido-Amine-Type Dispersants Containing Exclusively Non-Nucleophilic Nitrogen" (Year: 2018).*
(Continued)

*Primary Examiner* — Ellen M McAvoy
*Assistant Examiner* — Chantel L Graham
(74) *Attorney, Agent, or Firm* — Butler Snow LLP

(57) ABSTRACT

Provided herein are polyolefin dispersants, as well as methods for producing polyolefin dispersants. The polyolefin dispersants can be defined by the formula below

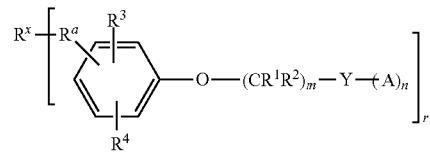

where $R^x$ is cationic initiator residue; $R^a$ is a polyolefin group; $R^1$ and $R^2$ are each, independently in each $-(CR^1R^2)$ unit, H, alkyl, alkoxy, or alkylaryl; $R^3$ and $R^4$ are each, independently, H, alkyl, or alkoxy; m is an integer from 1 to 20; n is an integer from 1 to 6; r is an integer from 1 to 4; Y is a polyvalent amine linker comprising one or more
(Continued)

tertiary amines, wherein the polyvalent amine linker does not include a primary amine or a secondary amine; and A is absent, or comprises a dispersive moiety.

20 Claims, 12 Drawing Sheets

Related U.S. Application Data

(60) Provisional application No. 62/560,036, filed on Sep. 18, 2017.

(51) Int. Cl.
    *C08F 210/14*     (2006.01)
    *C10M 149/18*     (2006.01)
    *C10M 149/22*     (2006.01)
    *C08F 110/10*     (2006.01)
    *C10L 10/18*     (2006.01)
    *C10L 1/2383*     (2006.01)
    *C10N 30/02*     (2006.01)
    *C10N 30/04*     (2006.01)
    *C10N 30/12*     (2006.01)
    *C10N 30/00*     (2006.01)
    *C10N 40/25*     (2006.01)

(52) U.S. Cl.
    CPC ......... *C08F 210/14* (2013.01); *C10M 149/18* (2013.01); *C10M 149/22* (2013.01); *C10L 1/2383* (2013.01); *C10L 10/18* (2013.01); *C10M 2215/26* (2013.01); *C10M 2215/28* (2013.01); *C10M 2217/044* (2013.01); *C10M 2217/046* (2013.01); *C10N 2030/02* (2013.01); *C10N 2030/04* (2013.01); *C10N 2030/12* (2013.01); *C10N 2030/36* (2020.05); *C10N 2040/25* (2013.01)

(58) Field of Classification Search
    CPC ...... C08F 210/14; C10L 10/18; C10L 1/2383; C10M 149/18; C10M 149/22; C10M 2215/26; C10M 2215/28; C10M 2217/044; C10M 2217/046; C10N 2030/02; C10N 2030/04; C10N 2030/12; C10N 2030/36; C10N 2040/25
    See application file for complete search history.

(56) References Cited

U.S. PATENT DOCUMENTS

| | | | |
|---|---|---|---|
| 4,612,132 | A | 9/1986 | Wollenberg et al. |
| 4,940,552 | A | 7/1990 | Cengel et al. |
| 5,080,815 | A | 1/1992 | Fenoglio et al. |
| 6,121,211 | A | 9/2000 | Stachew et al. |
| 6,146,431 | A | 11/2000 | Harrison et al. |
| 8,344,073 | B2 | 1/2013 | Storey et al. |
| 8,394,898 | B2 | 3/2013 | Storey |
| 8,530,586 | B2 | 9/2013 | Stokes et al. |
| 8,552,122 | B2 | 10/2013 | Storey et al. |
| 9,315,595 | B2 | 4/2016 | Storey et al. |
| 2004/0048753 | A1 | 3/2004 | Ritchie et al. |
| 2007/0155911 | A1* | 7/2007 | Stokes ............... C08F 8/00 525/341 |
| 2012/0277435 | A1 | 11/2012 | King et al. |
| 2013/0131280 | A1 | 5/2013 | Storey et al. |
| 2014/0155308 | A1 | 6/2014 | Chang et al. |

FOREIGN PATENT DOCUMENTS

| | | |
|---|---|---|
| EP | 0733696 A1 | 9/1996 |
| JP | 1995258347 A | 10/1995 |
| JP | 1998504585 A | 5/1998 |
| JP | 2007523897 A | 8/2007 |
| JP | 2012504611 A | 2/2012 |
| JP | 2012524822 A | 10/2012 |
| JP | 2015535553 A | 12/2015 |
| WO | 1997043359 A1 | 11/1997 |
| WO | 2006110647 | 10/2006 |
| WO | 2014085047 A1 | 6/2014 |

OTHER PUBLICATIONS

Pirouz, Solmaz, et al. "Characterization of the Chemical Composition of Polyisobutylene-Based Oil-Soluble Dispersants by Fluorescence." The Journal of Physical Chemistry B, 2014, 118(14): 3899-3911.

Harrison, James J., et al. "2D-INADEQUATE structural assignment of polybutene oligomers." The Journal of Organic Chemistry, 1997, 62(3): 693-699.

Puskas, I., et al., "The nature of the double bond in low molecular weight polyisobutylenes and polybutene copolymers." Journal of Polymer Science Polymer Symposia, 1976, 56(1): 191-202.

Günther, Wolfgang, et al. "Structural investigations on low-molecular-weight polyisobutenes." Die Angewandte Makromolekulare Chemie: Applied Macromolecular Chemistry and Physics, 1996, 234(1): 71-90.

Argo, C., S., et al. "Identification of olefin end groups in commercial polybutene oligomers." Polymer Bulletin, 2000, 44(1): 71-78.

Morgan, David L., et al. "End-Quenching of TiCl$_4$-catalyzed Quasiliving Polyisobutylene with Alkoxybenzenes for Direct Chain End Functionalization," Macromolecules, 2010, 43(21): 8724-8740.

Laduron, Frédéric, et al. "Efficient and scalable method for the selective alkylation and acylation of secondary amines in the presence of primary amines." Organic Process Research & Development, 2005, 9(1): 102-104.

Mach, H., and P. Rath. "Highly reactive polyisobutene as a component of a new generation of lubricant and fuel additives." Lubrication Science 11.2 (1999): 175-185. Mach, Rath http://onlinelibrary.wiley.com/doi/10.1002/ls.3010110205/abstract.

Machl, D., M. J. Kunz, and W. H. Binder. "Novel synthetic routes to aminofunctionalized polyisobutylene." Abstracts of Papers of the American Chemical Society. vol. 226. 1155 16th St, Nw, Washington, Dc 20036 USA: Amer Chemical SOC, 2003.

Binder, Wolfgang H., et al. "Synthesis and analysis of telechelic polyisobutylenes for hydrogen-bonded supramolecular pseudo-block copolymers." Macromolecules, 2004, 37(5): 1749-1759.

De, Priyadarsi, and R. Faust. "Living cationic polymerization of p-methylstyrene using SnCl4 in dichloromethane and determination of absolute rate constant of propagation." Abstracts of Papers of the American Chemical Society. vol. 230. 1155 16th St, NW, Washington, DC 20036 USA Amer Chemical Soc, 2005.

De, Priyadarsi, and Rudolf Faust. "Relative reactivity of C4 olefins toward the polyisobutylene cation," Macromolecules, 2006, 39(20): 6861-6870.

Higashihara, Tomoya, et al. "Synthesis of Poly (isobutylene-block-methyl methacrylate) by a Novel Coupling Approach." Macromolecules, 2006, 39(16): 5275-5279.

De, Priyadarsi, and Rudolf Faust. "Carbocationic polymerization of isobutylene using methylaluminum bromide coinitiators: synthesis of bromoallyl functional polyisobutylene." Macromolecules, 2006, 39(22): 7527-7533.

Ummadisetty, S.; Kennedy, J.P. "Quantitative syntheses of novel polyisobutylenes fitted with terminal primary -Br, -OH, -NH2, and methacrylate termini", Journal of Polymer Science, Part A: Polymer Chemistry, 2008, 46: 4236-4242.

Ho, Y.-S., et al. "Regression Analysis for the Sorption Isotherms of Basic Dyes on Sugarcane Dust." Bioresour. Technol., 2005, 96(11): 1285-1291.

Martinez-Castro, Nemesio, et al. "Primary Halide-Terminated Polyisobutylene: End-Quenching of Quasiliving Carbocationic Polymerization with N-(ω-Haloalkyl) pyrrole." Macromolecules, 2009, 42(14): 4963-4971.

(56) References Cited

OTHER PUBLICATIONS

International Search Report and Written Opinion dated Jan. 7, 2019, issued in corresponding application No. PCT/US2018/051494, 14 pages.
International Preliminary Report on Patentability dated Apr. 2, 2020, issued in corresponding application No. PCT/US2018/051494, 8 pages.
Holbrook, Travis P. et al., "Synthesis, Characterization, and Evaluation of Polyisobutylene-Based imido-amine-type Dispersants Containing Exclusively Non-Nucleophilic Nitrogen," Journal of Polymer Science, Part A: Polymer Chemistry, 2018, 56(15): 1657-1675.
Morgan, D.L. et al., "End-Quenching of Quasi-Living Isobutylene Polymerizations with Alkoxybenzene Compounds," Marcomolecules, 2009, 42(18): 6844-6847.
Written Opinion issued by Intellectual Property Office of Singapore for Application No. 11202001971U, dated Feb. 9, 2021.

\* cited by examiner

POLYOLEFIN DISPERSANTS AND METHODS OF MAKING AND USING THEREOF

CROSS-REFERENCE TO RELATED APPLICATIONS

This application is a continuation of U.S. patent application Ser. No. 16/134,474 filed Sep. 18, 2018, now U.S. Pat. No. 10,875,946, which claims the benefit of U.S. Provisional Application No. 62/560,036, filed Sep. 18, 2017, each of which is hereby incorporated herein by reference in its entirety.

BACKGROUND

Lubricating motor oils intended for use in internal combustion engines are typically formulated with a variety of additives that are intended to aid in the reduction of corrosion, deposit formation, wear, etc. Ashless dispersants are a type of additive. The role of dispersants in lubricating oils is to regulate viscosity increases and prevent the formation of sludge, varnish, and other deposits, which occur due to the formation and presence of soot and other carbonaceous impurities that originate from the incomplete oxidation of fuel and that enter the base oil from the combustion chamber under normal operation of the engine. In addition, high molecular weight dispersants may also reduce or prevent particle-induce wear.

Ideally, dispersants should also be compatible with (i.e., benign toward) engine components that come into contact with the lubricating oil, including metal surfaces, gaskets, and seals. However, many existing dispersants can damage engine components, leading to equipment failure. Dispersants that exhibit improved compatibility with engine components, including gaskets and seals, can be used to formulate lubricating motor oils with enhanced performance characteristics.

SUMMARY

Polyolefin dispersants that include one or more tertiary amines but lack primary and secondary amines are described herein. Because the polyolefin dispersants include one or more tertiary amines and no primary amines or secondary amines, the dispersants can exhibit increased compatibility towards fluoroelastomeric automotive seals.

For example, provided herein are polyolefin dispersants defined by Formula I below

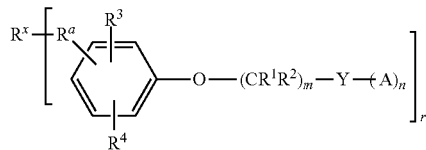

Formula I where $R^x$ is a cationic initiator residue; $R^a$ is a polyolefin group; $R^1$ and $R^2$ are each, independently in each —$(CR'R^2)$— unit, H, alkyl, alkoxy, or alkylaryl; $R^3$ and $R^4$ are each, independently, H, alkyl, or alkoxy; m is an integer from 1 to 20; n is an integer from 1 to 6; r is an integer from 1 to 4; Y is a polyvalent amine linker comprising one or more tertiary amines, wherein the polyvalent amine linker does not include a primary amine or a secondary amine; and A is absent, or comprises a dispersive moiety.

Also provided are methods of making the polyolefin dispersants described herein. The polyolefin dispersants can be formed via post-polymerization modification of polyolefins. For example, the polyolefin dispersants can be derived from polyolefin substrates bearing a leaving group (e.g., a halogen) that is readily displaceable by nucleophilic compounds without competing elimination. Suitable primary halogen-terminated polyolefins can be prepared, for example, via in situ chain end functionalization of living carbocationic polyolefins by direct addition of alkoxybenzene derivatives to a living polymerization, or alternatively, to a pre-formed tert-chloride-terminated polyolefin activated by a Lewis acid, or alternatively to an olefin-terminated polyolefin activated by a protic/Lewis acid combination.

In some embodiments, methods for preparing polyolefin dispersants can comprise (a) generating a quasiliving polyolefin in a reversible deactivation-type living polymerization; (b) adding to the reversible deactivation-type living polymerization of step (a) a quenching agent defined by Formula V to generate a phenoxy-quenched precursor;

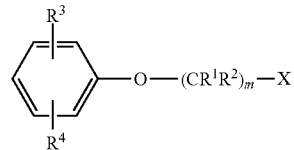

Formula V wherein $R^1$, $R^2$, $R^3$, $R^4$, and m are as defined above with respect to Formula I, and X is a leaving group; (c) reacting the phenoxy-quenched precursor with a polyamine to form a polyamine-capped precursor; and (d) reacting the polyamine-capped precursor with an anhydride to form the polyolefin dispersant.

DETAILED DESCRIPTION

Definitions

Figure 1A:
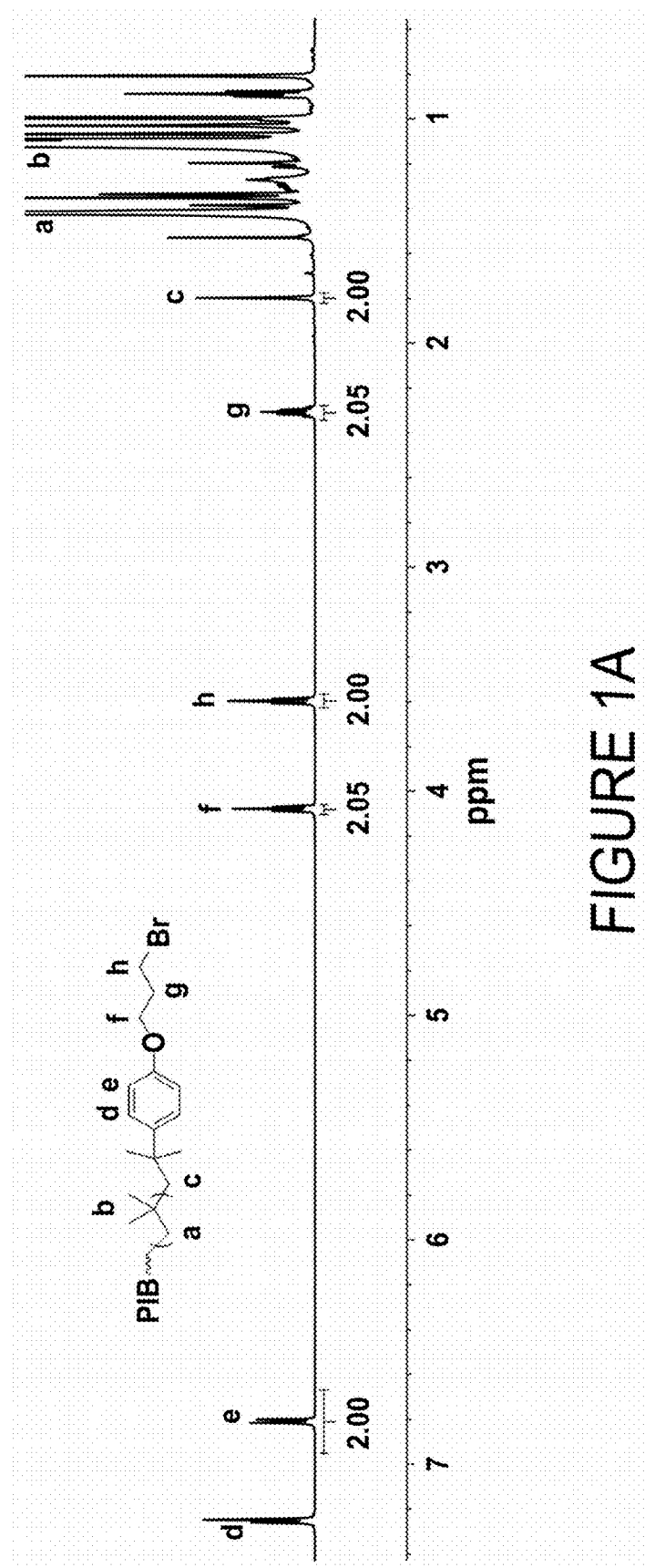
FIG. 1A is a $^1$H NMR (600 MHz, CD$_3$Cl, 22° C.) spectrum of α,ω-bis[4-(3-bromopropoxy)phenyl]polyisobutylene obtained by direct quenching of a TiCl$_4$-catalyzed quasiliving isobutylene polymerization.

To facilitate understanding of the disclosure set forth herein, a number of terms are defined below. Unless defined otherwise, all technical and scientific terms used herein generally have the same meaning as commonly understood by one of ordinary skill in the art to which this disclosure belongs. The organic moieties mentioned when defining variable positions within the general formulae described herein (e.g., the term "halogen") are collective terms for the individual substituents (e.g., fluorine, chlorine, bromine, iodine, etc.) encompassed by the organic moiety. The prefix Cn-Cm preceding a group or moiety indicates, in each case, the possible number of carbon atoms in the group or moiety that follows.

As used herein, the term "alkyl" refers to saturated, straight-chained or branched hydrocarbon moieties. Unless otherwise specified, $C_1$-$C_8$ (e.g., $C_1$-$C_6$, or $C_1$-$C_4$) alkyl groups are intended. Examples of alkyl groups include methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, and 1-ethyl-2-methylpropyl. Alkyl substituents may be unsubstituted or substituted with one or more chemical moieties. The alkyl group may be substituted with one or more groups including, but not limited to, hydroxyl, halogen, acyl, alkyl, alkoxy, alkenyl, alkynyl, aryl, heteroaryl, acyl, aldehyde, amino, carboxylic acid, ester, ether, ketone, nitro, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups can also specifically be referred to herein by identifying the specific substituent(s) on the alkyl group. For example, the term "alkylaryl" can be used to specifically refer to an alkyl group that is substituted with one or more aryl groups (e.g., phenyl groups). When "alkyl" is used in one instance and a specific term such as "alkylaryl" is used in another, it is not meant to imply that the term "alkyl" does not also refer to specific terms such as "alkylaryl" and the like.

As used herein, the term "alkoxy" refers to a group of the formula $Z^1$—O—, where $Z^1$ is unsubstituted or substituted alkyl as defined above. Unless otherwise specified, alkoxy groups wherein $Z^1$ is a $C_1$-$C_8$ (e.g., $C_1$-$C_6$, $C_1$-$C_4$) alkyl group are intended. Examples include methoxy, ethoxy, propoxy, 1-methylethoxy, butoxy, 1-methylpropoxy, 2-methylpropoxy, 1,1-dimethylethoxy, pentoxy, 1-methylbutyloxy, 2-methylbutoxy, 3-methylbutoxy, 2,2-dimethylpropoxy, 1-ethylpropoxy, hexoxy, 1,1-dimethylpropoxy, 1,2-dimethylpropoxy, 1-methylpentoxy, 2-methylpentoxy, 3-methylpentoxy, 4-methylpenoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy, and 1-ethyl-2-methylpropoxy.

As used herein, the term "aryl" refers to groups that include a monovalent aromatic carbocyclic group of from 3 to 20 carbon atoms. Aryl groups can include a single ring or multiple condensed rings. In some embodiments, aryl groups include $C_6$-$C_{10}$ aryl groups. Examples of aryl groups include, but are not limited to, phenyl, biphenyl, naphthyl, tetrahydronaphthyl, phenylcyclopropyl, and indanyl. In some embodiments, the aryl group can be a phenyl, indanyl or naphthyl group. Aryl substituents may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, cycloalkyl, ester, ether, halide, hydroxyl, keto, nitro, silyl, sulfo-oxo, sulfonyl, sulfone, sulfoxide, or thiol.

As used herein, the term "cycloalkyl" refers to a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is replaced by a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxyl, alkenyl, alkynyl, aryl, heteroaryl, acyl, aldehyde, amino, carboxylic acid, ester, ether, halide, hydroxy, keto, nitro, silyl, sulfo-oxo, sulfonyl, sulfone, sulfoxide, or thiol.

As used herein, the term "imide" refers to a chemical moiety that includes two acyl groups bound to nitrogen, as shown in the general formula below.

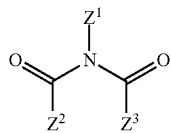

Imide moieties can be linear or cyclic. In the case of cyclic imides, $Z^2$ and $Z^3$, together with the atoms to which they are attached, form a five, six, seven, or eight membered ring. This ring may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, cycloalkyl, ester, ether, halide, hydroxyl, keto, nitro, silyl, sulfo-oxo, sulfonyl, sulfone, sulfoxide, or thiol. This ring may also be annulated with one or more cycloalkyl, aryl, or heteroaryl rings, such that $Z^2$ and $Z^3$, together with the atoms to which they are attached, form a five, six, seven, or eight membered ring that is fused to one or more additional cyclic moieties.

As used herein, the term "initiator" refers to a compound capable of providing one or more carbocations, in one embodiment, one, two, or three carbocations, to which a monomer (e.g., olefin or isobutylene) or a comonomer may add during a carbocationic polymerization.

As used herein, the term "mono-functional initiator" refers to an initiator that provides approximately one stoichiometric equivalent of carbocation relative to initiator. When a mono-functional initiator is used, the chain-end concentration is approximately equal to the initiator concentration.

As used herein, the term "multi-functional initiator" refers to an initiator that provides approximately x stoichiometric equivalents of carbocation relative to initiator, wherein x represents the functionality of the initiator. When a multi-functional initiator is used and the functionality of the initiator equals x, then the chain-end concentration equals x times the initiator concentration. In some embodiments, x is 2, and the initiator is a bi-functional initiator.

As used herein, the term "initiator residue" refers to a monovalent, divalent, or polyvalent moiety that is bonded to one, two, or more polymer groups. In certain embodiments, the initiator residue is derived from an initiator. In certain embodiments, the initiator residue is the portion of an initiator that remains after forming one, two, or more carbocations and reacting with a monomer or comonomer during a polymerization.

As used herein, the term "monomer" refers to a compound that is capable of forming one of the two or more repetitive units of a polymer. In certain embodiments, the monomer is an olefin. In certain embodiments, the monomer is isobutene.

As used herein, the terms "polyolefin" and "polyolefin group" refer to a polymer or oligomer that comprises two or more monomeric units derived from an olefin. In certain embodiments, the polyolefin is polyethylene, polypropylene, polyisobutylene, or polystyrene. In certain embodiments, the polyolefin is a homopolyolefin. In certain embodiments, the polyolefin is a polyolefin copolymer. In some embodiments, the polyolefin has a molecular weight from about 300 to in excess of a million g/mol. In some embodiments, the polyolefin has a molecular weight of from about 200 to 10,000 g/mol. In some embodiments, the polyolefin has a molecular weight of from about 1,000 to 5,000 g/mol. In some embodiments, the polyolefin has a molecular weight of from about 2,000 to 3,000 g/mol. In some embodiments, the polyolefin has a molecular weight of from about 100,000 to 1,000,000 g/mol. In some embodiments, the polyolefin has a molecular weight greater than 200 g/mol. In some embodiments, the polyolefin has a molecular weight greater than 400 g/mol. In some embodiments, the polyolefin has a molecular weight greater than 600 g/mol. In some embodiments, the polyolefin has a molecular weight greater than 800 g/mol. In some embodiments, the polyolefin has a molecular weight greater than 1,000 g/mol. In some embodiments, the polyolefin has a molecular weight greater than 5,000 g/mol. In some embodiments, the polyolefin has a molecular weight greater than 10,000 g/mol. In some embodiments, the polyolefin has a molecular weight greater than 100,000 g/mol. In some embodiments, the polyolefin has a molecular weight greater than 500,000 g/mol. In some embodiments, the polyolefin has a molecular weight greater than 1,000,000 g/mol. In some embodiments, the polyolefin is derived from a mono-functional initiator, bi-functional initiator, or multi-functional initiator. In some embodiments, the polyolefin is polyisobutene.

As used herein, the terms "polyisobutylene," "polyisobutylene group," and "PIB" refer to a polymer comprising two or more monomeric isobutylene units. In certain embodiments, the polyisobutylene comprises an initiator residue. In certain embodiments, the polyisobutylene is a homopolyisobutylene. In certain embodiments, the polyisobutylene is a polyisobutylene copolymer.

As used herein, the term "quasiliving polyolefin" refers to a polyolefin that has been formed using a reversible deactivation-type living polymerization. In some embodiments, the quasiliving polyolefin can be a quasiliving carbocationic polyolefin.

As used herein, the term "reversible deactivation-type living polymerization" refers to a polymerization process that proceeds with minimal irreversible chain termination and minimal chain transfer. Such polymerizations proceed by initiation followed by propagation, wherein propagating (active) species are in equilibrium with non-propagating (dormant) polymer chains. In some embodiments, the reversible deactivation-type living polymerization can be a reversible deactivation-type living carbocationic polymerization, also referred to as a quasiliving carbocationic polymerization.

As used herein, the term "terminator" refers to a compound that deactivates a Lewis acid.

As used herein, the term "Lewis acid" refers to a chemical entity that is capable of accepting a pair of electrons.

As used herein, the term "leaving group" refers to a functional group that is capable of being substituted under certain reaction conditions. Suitable leaving groups are well known in the field of organic chemistry, and include, for example, halides such as —Cl, —Br, and —I, sulfonates such as p-toluenesulfonate (tosyl), methanesulfonate (mesyl), and trifluoromethanesulfonate (triflate), as well as pseudohalides. The term "pseudohalide" is well known in the chemical field and is employed herein in its conventional sense to mean a substituent that exhibits significant similarity to the halogens as regards to their properties as a leaving group. Examples of pseudohalides include azide, nitrile (cyanide), cyanate, and thiocyanate.

Dispersants

The majority of existing motor oil dispersants are of either the Mannich type, created by reaction of an alkylated phenol with formaldehyde and a polyamine, or the alkyl succinimide type, created by reaction of a polyamine with an alkyl succinic anhydride.

Polyisobutylene succinimide (PIBSI) dispersants represent an important class of alkyl succinimide type dispersants. Presently, PIBSI dispersants are prepared from polyisobutylenes (PIBs) bearing olefinic end groups. Briefly, PIB chains with olefinic end groups can be synthesized via acid-catalyzed (e.g., $AlCl_3$, $BF_3$, or $BF_3$ complexes) polymerization of isobutylene. $BF_3$-based catalysts yield high-reactivity (HR) PIBs that possess high fractions of methyl vinylidene (exo-olefin) end groups and are favored because of their higher reactivity in subsequent functionalization reactions. $AlCl_3$-based catalysts yield a complex mixture of terminal olefin types, including high fractions of low reactivity tri- and tetrasubstituted olefins. The formation of polyisobutylene succinic anhydride (PIBSA) can then be accomplished by reaction of olefin-terminated PIB with maleic anhydride, either through a chlorine-mediated reaction that proceeds via a Diels-Alder mechanism (PIB derived from $AlCl_3$ catalyst) or a thermal-mediated reaction at temperatures greater than 200° C. that proceeds through an ene mechanism ($BF_3$ catalyst). Subsequent imidization of PIBSA with a heavy polyamine (e.g., triethylene tetramine, or tetraethylene pentamine) can then be carried out with the removal of water to form the PIBSI dispersant. The resulting PIBSI dispersants contain numerous primary and/or secondary amines which, as discussed below, is a significant drawback to this class of dispersants.

In many cases, the seals found within automotive engines are formed from fluoroelastomers (e.g., VITON®), with the main constituent of those fluoroelastomers being repeat units derived from vinylidene difluoride. There are numerous modes of failure for automotive seals that can lead to loss of lubricant and equipment failure including shrinkage, loss of elongation, and increased rigidity. The onset of these failures is primarily due to degradative reactions between fluoroelastomers and lubricant additives. Due to the nature of their polar head group, PIBSI dispersants can diffuse into fluoroelastomer seals, and degrade the seals by removal of plasticizer and/or participation in dehydrofluorination reactions along the fluoroelastomer backbone. Dehydrofluorination reactions introduce unsaturations along the fluoroelastomer backbone. These unsaturations can participate in subsequent crosslinking reactions or thermal oxidation, either of which can lead to a loss of elongation and eventual embrittlement of the seal.

Basic amines (1°, 2°, and 3°) present in existing PIBSI dispersants are responsible for dehydrofluorination and resulting unsaturations within fluoroelastomeric automotive seals. However, only nucleophilic primary and secondary amines can participate in subsequent Michael addition reactions with unsaturations that lead to crosslinking reactions and ultimately seal embrittlement and failure. Tertiary amines are not capable of Michael addition reactions due to absence of replaceable hydrogens on nitrogen. Thus, for conventional dispersants that contain primary and secondary amines, greater nitrogen content and higher treat rates of the dispersant, which are generally desirable to promote engine cleanliness over extended service periods, will be more aggressive to the fluoroelastomer seals.

Methods for improving the compatibility of conventional PIBSI dispersants with automotive seals include the post-treatment of dispersants to render nucleophilic primary and secondary amines unreactive or to limit diffusion of the dispersant into the seals, for example, by increasing the steric bulkiness of the dispersant.

Polyolefin dispersants that include one or more tertiary amines but lack primary and secondary amines are described herein. The polyolefin dispersants can be formed via post-polymerization modification of polyolefins. For example, the polyolefin dispersants can be derived from polyolefin substrates bearing a leaving group (e.g., a halogen) that is readily displaceable by nucleophilic compounds without competing elimination. Suitable primary halogen-terminated polyolefins can be prepared, for example, via in situ chain end functionalization of living carbocationic polyolefins by direct addition of alkoxybenzene derivatives to a living polymerization, or alternatively, to a pre-formed tert-chloride-terminated polyolefin activated by a Lewis acid, or alternatively to an olefin-terminated polyolefin activated by a protic/Lewis acid combination. Because the polyolefin dispersants include one or more tertiary amines and no primary amines or secondary amines, they cannot participate in crosslinking reactions with fluoroelastomers. As a consequence, the polyolefin dispersants can exhibit increased compatibility towards automotive seals.

For example, provided herein are polyolefin dispersants defined by Formula I below Formula I

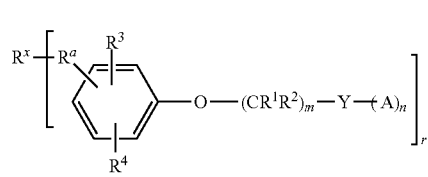

where $R^x$ is an initiator residue; $R^a$ is a polyolefin group; $R^1$ and $R^2$ are each, independently in each —$(CR^1R^2)$— unit, H, alkyl, alkoxy, or alkylaryl; $R^3$ and $R^4$ are each, independently, H, alkyl, or alkoxy; m is an integer from 1 to 20; n is an integer from 1 to 6; r is an integer from 1 to 4; Y is a polyvalent amine linker comprising one or more tertiary amines, wherein the polyvalent amine linker does not include a primary amine or a secondary amine; and A is absent, or comprises a dispersive moiety.

In some embodiments, the dispersant can be defined by Formula IA below

Formula IA

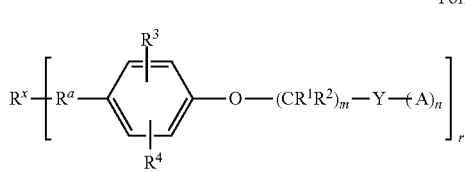

wherein $R^x$, $R^a$, $R^1$, $R^2$, $R^3$, $R^4$, m, n, r, Y, and A are defined as defined above in Formula I.

In some embodiments, $R^a$ can comprise a polyisobutylene group. In some embodiments, the polyolefin dispersant can be a dispersant for use in lubricating oils, and $R^a$ can have a molecular weight of from 1,000 Da to 2,500 Da (e.g., from 1,000 Da to 2,000 Da; from 1,500 Da to 2,500 Da, from 1,500 Da to 2,000 Da, from 2,000 Da to 2,500 Da). In other embodiments, the polyolefin dispersant can be an additive for use in a hydrocarbon fuel, and $R^a$ can have a molecular weight of less than 1,000 Da (e.g., from 100 Da to less than 1,000 Da; from 200 Da to 900 Da, from 100 Da to 500 Da, from 500 Da to less than 1,000 Da, from 250 Da to less than 1,000 Da, or from 750 to less than 1,000 Da).

In some embodiments, m can an integer from 1 to 10 (e.g., an integer from 1 to 8, an integer from 1 to 6, or an integer from 1 to 4).

In some embodiments, $R^1$ and $R^2$ can be, independently for each occurrence, H or alkyl (e.g., a $C_1$-$C_6$ alkyl group). In certain embodiments, $R^1$ and $R^2$ are H in all occurrences.

In some embodiments, $R^3$ and $R^4$ are both positioned ortho on the phenyl ring relative to $R^a$. In other embodiments, $R^3$ and $R^4$ are both positioned meta on the phenyl ring relative to $R^a$. In certain embodiments, $R^3$ and $R^4$ are both H.

Y can be any suitable polyvalent amine linker that includes one or more tertiary amines, and does not include a primary amine or a secondary amine. In some embodiments, Y can comprise from 2 to 30 carbon atoms (e.g., from 4 to 30 carbon atoms, from 6 to 30 carbon atoms, from 6 to 20 carbon atoms, from 6 to 15 carbon atoms, or from 6 to 10 carbon atoms).

The number of tertiary amines present in Y can be varied to influence the dispersive properties of the resulting polyolefin dispersant. For example, in some embodiments, the polyvalent amine linker can include at least 1 tertiary amine (e.g., at least 2 tertiary amines, at least 3 tertiary amines, at least 4 tertiary amines, at least 5 tertiary amines, at least 6 tertiary amines, or at least 7 tertiary amines). In some embodiments the polyvalent amine linker can include 8 tertiary amines or less (e.g., 7 tertiary amines or less, 6 tertiary amines or less, 5 tertiary amines or less, 4 tertiary amines or less, 3 tertiary amines or less, or 2 tertiary amines or less).

The polyvalent amine linker can include a number of tertiary amines ranging from any of the minimum values described above to any of the maximum values described above. For example, in some embodiments, Y can include from 1 to 8 tertiary amines (e.g., from 2 to 8 tertiary amines, from 1 to 6 tertiary amines, from 2 to 6 tertiary amines, from 1 to 4 tertiary amines, from 2 to 4 tertiary amines, or from 1 to 3 tertiary amines).

In some embodiments, Y can comprise a bivalent amine linker and n can be 1. For example, in some embodiments, Y can be defined by the structure below

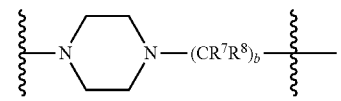

where $R^7$ and $R^8$ are each, independently in each —$(CR^1R^2)$ unit, H, alkyl, alkoxy, or alkylaryl; and b is an integer from 1 to 20 (e.g., an integer from 1 to 10, an integer from 1 to 8, an integer from 1 to 6, or an integer from 1 to 4). In some of these embodiments, $R^7$ and $R^8$ can both be, in each occurrence, H.

In other embodiments, Y can be defined by the structure below

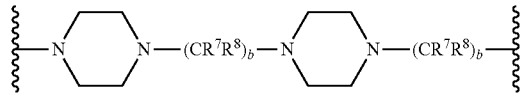

where $R^7$ and $R^8$ are each, independently for each occurrence, H, alkyl, alkoxy, or alkylaryl; and b is, independently for each occurrence, an integer from 1 to 20 (e.g., an integer from 1 to 10, an integer from 1 to 8, an integer from 1 to 6, or an integer from 1 to 4). In some of these embodiments, $R^7$ and $R^8$ can both be, in each occurrence, H. In some of these embodiments, b is, in each occurrence, 2.

In other embodiments, Y can comprise a trivalent amine linker and n can be 2. For example, in some embodiments, Y can be defined by the structure below

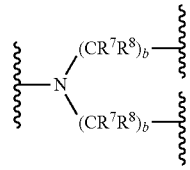

where $R^7$ and $R^8$ are each, independently in each —$(CR^1R^2)$ unit, H, alkyl, alkoxy, or alkylaryl; and b is an integer from 1 to 20 (e.g., an integer from 1 to 10, an integer from 1 to 8, an integer from 1 to 6, or an integer from 1 to 4). In some of these embodiments, $R^7$ and $R^8$ can both be, in each occurrence, H.

In some embodiments, A is absent, and Y can be defined by the structure below

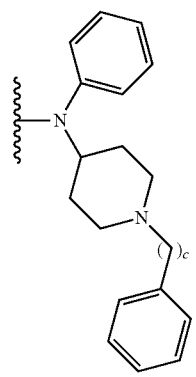

where c is an integer from 1 to 6. In some of these embodiments, c can be 1. In other of these embodiments, c can be 2.

In some embodiments, A is absent, and Y can be defined by the structure below

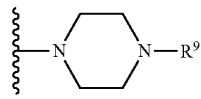

where $R^9$ is alkyl, cycloalkyl, alkoxy, aryl, heteroaryl, alkylaryl, alkylcycloalkyl or heteroarylalkyl. In certain embodiments, $R^9$ can be aryl or heteroaryl. In certain embodiments, $R^9$ can be phenyl. In other embodiments, $R^9$ can be pyridyl. For example, in one embodiment, A can be absent and Y can be defined by the structure below

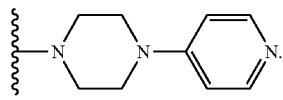

In some embodiments, A is absent, and Y can be defined by the structure below

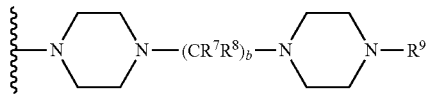

where $R^7$ and $R^8$ are each, independently for each occurrence, H, alkyl, alkoxy, or alkylaryl; $R^9$ is alkyl, cycloalkyl, alkoxy, aryl, heteroaryl, alkylaryl, alkylcycloalkyl or heteroarylalkyl; and b is, independently for each occurrence, an integer from 1 to 20 (e.g., an integer from 1 to 10, an integer from 1 to 8, an integer from 1 to 6, or an integer from 1 to 4). In some of these embodiments, $R^7$ and $R^8$ can both be, in each occurrence, H. In some of these embodiments, b is, in each occurrence, 2. In some of these embodiments, $R^9$ can be aryl or heteroaryl. In some of these embodiments, $R^9$ can be phenyl. In some of these embodiments, $R^9$ can be pyridyl.

In some embodiments, A is absent. In other embodiments, A is present. When present, A can be any suitable dispersive moiety. Dispersive moieties include chemical moieties that have an affinity for the surface of soot particles. Examples of such chemical moieties are known in the art, and include, for example, moieties that are able to participate in π-π interactions with the surface of soot (e.g., aromatic groups). Other examples of dispersive moieties include chemical moieties that can be formed by reaction of a primary amine with a reactive functional group (e.g., an isocyanate, or a carbonyl, such as a carboxylic acid, acyl halide, or aldehyde).

In some embodiments, A can comprise an imide moiety. In certain embodiments, the imide can comprise a cyclic imide. For example, in some cases the imide moiety can comprise a moiety defined by Formula III below

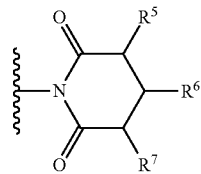

Formula III where $R^5$, $R^6$, and $R^7$ are each, independently, H, halogen, alkyl, alkoxy, aryl, alkylaryl, or cycloalkyl; or wherein $R^5$ and $R^6$, together with the atoms to which they are attached, $R^6$ and $R^7$, together with the atoms to which they are attached, or both $R^5$ and $R^6$ and $R^6$ and $R^7$, together with the atoms to which they are attached, form a 5-8 membered substituted or unsubstituted aromatic or non-aromatic ring. For example, the imide moiety comprises one of the following

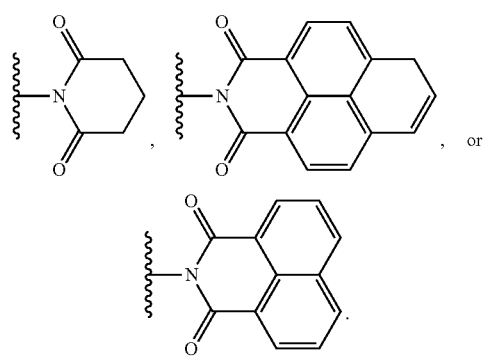

, or

In other embodiments, the imide moiety can comprise a moiety defined by Formula IV below

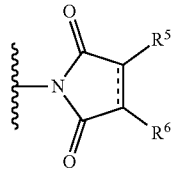

Formula IV where $R^5$ and $R^6$ are each, independently, H, halogen, alkyl, alkenyl, alkoxy, aryl, alkylaryl, or cycloalkyl, or wherein $R^5$ and $R^6$, together with the atoms to which they are attached, form a 5-8 membered substituted or unsubstituted aromatic or non-aromatic ring. In some embodiments, the imide moiety can comprise one of the following

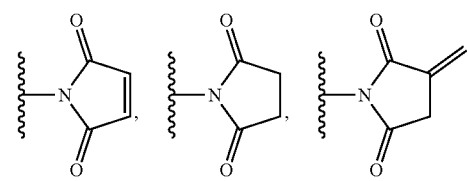

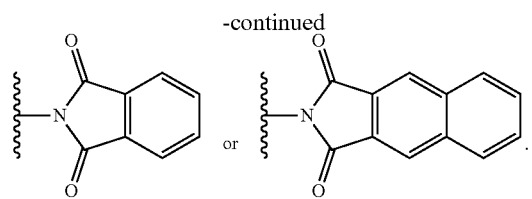

In one embodiment of Formula IV, $R^5$ can be an alkyl group and $R^6$ can be H. In one embodiment of Formula IV, $R^5$ can be a polyolefin group (e.g., a polyisobutylene group) and $R^6$ can be H.

In some embodiments, A can comprise a diimide moiety or a polyimide moiety. For example, in some embodiments, the polyolefin dispersant can be defined by Formula IB below Formula IB

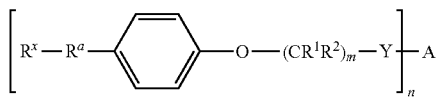

where $R^x$ is an initiator residue; IV is a polyolefin group; $R^1$ and $R^2$ are each, independently in each —$(CR^1R^2)$— unit, H, alkyl, alkoxy, or alkylaryl; $R^3$ and $R^4$ are each, independently, H, alkyl, or alkoxy; m is an integer from 1 to 20; n is an integer from 1 to 100; r is an integer from 1 to 4; Y is a polyvalent amine linker comprising one or more tertiary amines, wherein the polyvalent amine linker does not include a primary amine or a secondary amine; and A is absent, or comprises a diimide moiety or a polyimide moiety.

For example, in some embodiments, A can comprise a diimide moiety. For example, the diimide moiety can comprise an aromatic system substituted with two cyclic imide groups. The aromatic system can be a single aromatic ring (e.g., a phenyl ring substituted with two cyclic imide groups), a fused aromatic system (e.g., a naphthalene, anthracene, or perylene ring substituted with two cyclic imide groups), or two aromatic rings or fused aromatic systems linked together, each of which is substituted with a cyclic imide groups (e.g., a biphenyl, binaphthalene, or benzophenone in which each aromatic ring or fused aromatic system is substituted with a cyclic imide group). In certain embodiments, the polyolefin dispersant can be defined by the general structure shown below

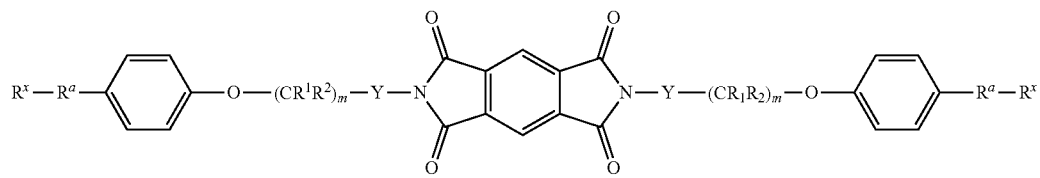

where $R^x$, $R^a$, $R^1$, $R^2$, m, and Y are defined as defined with respect Formula I.

In other embodiments, A can comprise a polyimide moiety. The polyimide moiety can comprise a molecular scaffold bearing three or more cyclic imide groups. In some embodiments, the molecular scaffold can comprise an aromatic system substituted with three or more cyclic imide groups. In some embodiments, the molecular scaffold can comprise a polymer substituted with three or more cyclic imide groups (e.g., a polymer or copolymer bearing three or more cyclic imide groups as sidechains and/or along the polymer backbone). For example, in certain embodiments, the polyolefin dispersant can be a polymer or copolymer that comprises a monomer defined by the general structure shown below

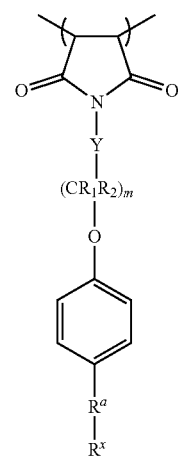

where $R^x$, $R^a$, $R^1$, $R^2$, m, and Y are defined as defined with respect Formula I. In certain embodiments, the polyolefin dispersant can be a copolymer that comprises a monomer defined by the general structure above and one or more additional monomers derived from polymerization of an ethylenically-unsaturated monomer. Examples of suitable ethylenically-unsaturated monomers include meth(acrylate) monomers, vinyl aromatic monomers having up to 20 carbon atoms (e.g., styrene), vinyl esters of carboxylic acids comprising up to 20 carbon atoms, (meth)acrylonitriles, vinyl halides, vinyl ethers of alcohols comprising 1 to 10 carbon atoms, aliphatic hydrocarbons having 2 to 8 carbon atoms and one or two double bonds, (meth)acrylamides, (meth)acrylamide derivatives, and combination of these monomers. As used herein, "(meth)acryl . . . " includes acryl . . . , methacryl . . . , diacryl . . . , and dimethacryl . . . . For example, the term "(meth)acrylate monomer" includes acrylate, methacrylate, diacrylate, and dimethacrylate monomers. Meth)acrylate monomers can include esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with C1-C20, C1-C12, C1-C8, or C1-C4 alkanols).

In some embodiments, $R^x$ can comprise a multi-functional initiator residue, and r can be an integer from 2 to 4. In some cases, $R^x$ can comprise a bi-functional initiator residue, and r can be 2. In these embodiments, the polyolefin dispersant can be defined by the general structure shown below

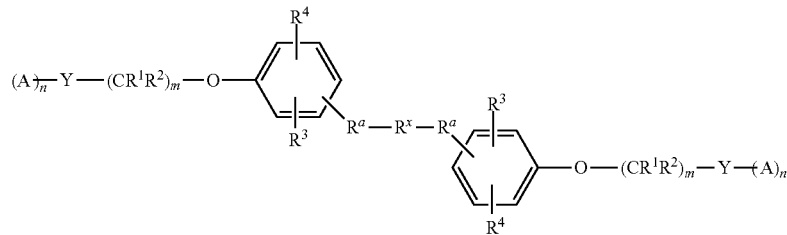

where $R^x$, $R^a$, $R^1$, $R^2$, $R^3$, $R^4$, m, n, Y, and A are defined as defined above in Formula I. In some of these embodiments, the polyolefin dispersant can be defined by the general structure shown below

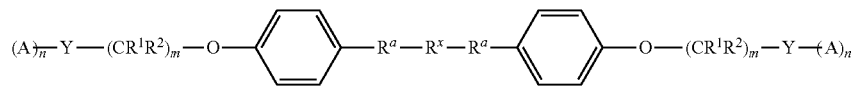

where $R^x$, $R^a$, $R^1$, $R^2$, $R^3$, $R^4$, m, n, Y, and A are defined as defined above in Formula I.

Examples of bi-functional initiator residues include, for example, initiator residues derived from 1,3-di(1-chloro-1-methylethyl)benzene, 1,3-di(1-methoxy-1-methylethyl)benzene, 1,4-di(1-chloro-1-methylethyl)benzene, 1,4-di(1-methoxy-1-methylethyl)benzene, 1,3-di(1-chloro-1-methylethyl)-5-tert-butylbenzene, 1,3-di(1-methoxy-1-methylethyl)-5-tert-butylbenzene, 2,6-dichloro-2,4,4,6-tetramethyl heptane, and 2,6-dimethoxy-2,4,4,6-tetramethylheptane. In some embodiments, the bi-functional initiator residue can be an initiator residue derived from 1,3-di(1-chloro-1-methylethyl)-5-tert-butylbenzene or 2,6-dichloro-2,4,4,6-tetramethylheptane. In certain embodiments, the bi-functional initiator residue can be an initiator residue derived from 1,3-di(1-chloro-1-methylethyl)-5-tert-butylbenzene.

In other cases, $R^x$ can comprise a tri-functional initiator residue, and r can be 3. In these embodiments, the polyolefin dispersant can be defined by the general structure shown below

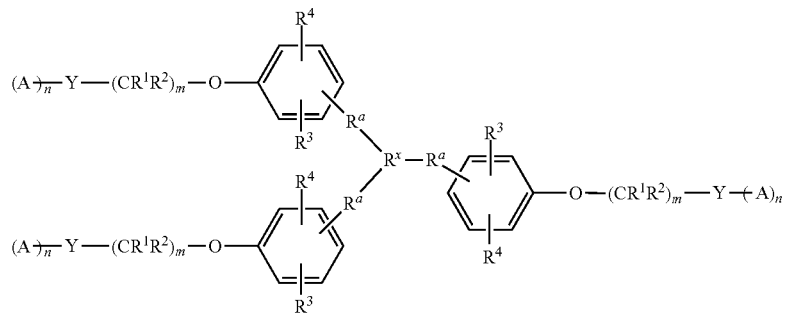

where $R^x$, $R^a$, $R^1$, $R^2$, $R^3$, $R^4$, m, n, Y, and A are defined as defined above in Formula I. In some of these embodiments, the polyolefin dispersant can be defined by the general structure shown below

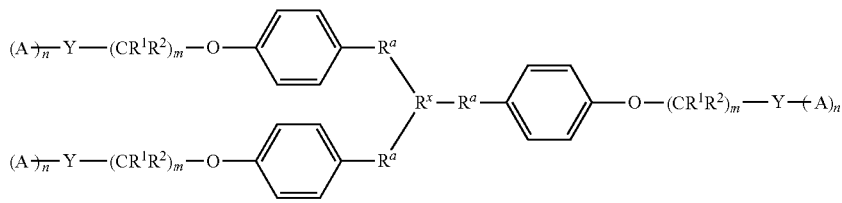

where $R^x$, $R^a$, $R^1$, $R^2$, $R^3$, $R^4$, m, n, Y, and A are defined as defined above in Formula I.

Examples of tri-functional initiator residues include, for example, initiator residues derived from 1,3,5-tri(1-chloro-1-methylethyl)benzene, 1,3,5-tri(1-bromo-1-methylethyl)benzene, or 1,3,5-tri(1-methoxy-1-methylethyl)benzene.

In other embodiments, $R^x$ can comprise a mono-functional initiator residue, and r is 1. In such embodiments, the dispersant can be defined by Formula IB below Formula IB

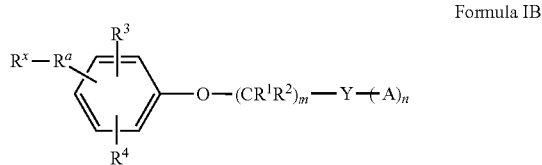

wherein $R^x$, $R^a$, $R^1$, $R^2$, $R^3$, $R^4$, m, n, Y, and A are defined as defined above in Formula I. In some of these embodiments, the dispersant can be defined by Formula II below Formula II

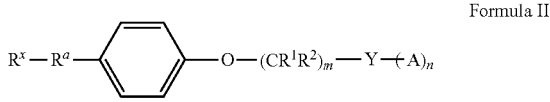

wherein $R^x$, $R^a$, $R^1$, $R^2$ m, n, Y, and A are defined as defined above in Formula I.

Examples of mono-functional initiator residues include, for example, initiator residues derived from 2-chloro-2-phenylpropane, 2-acetoxy-2-phenylpropane, 2-propionyloxy-2-phenylpropane, 2-methoxy-2-phenylpropane, 2-ethoxy-2-phenylpropane, 2-chloro-2,4,4-trimethylpentane, 2-acetoxy-2,4,4,-trimethylpentane, 2-propionyloxy-2,4,4-trimethylpentane, 2-methoxy-2,4,4-trimethylpentane, 2-ethoxy-2,4,4-trimethylpentane, 2-chloro-2,4,4,6,6-pentamethylheptane, 2-acetoxy-2,4,4,6,6-pentamethylheptane, 2-propionyloxy-2,4,4,6,6-pentamethylheptane, 2-methoxy-2,4,4,6,6-pentamethylheptane, and 2-ethoxy-2,4,4,6,6-pentamethylheptane. In certain embodiments, the mono-functional initiator residue can be an initiator residue derived from 2-chloro-2,4,4-trimethylpentane.

Methods

The polyolefin dispersants described herein can be formed via post-polymerization modification of polyolefins using inexpensive reagents and materials. For example, the polyolefin dispersants can be derived from polyolefin substrates bearing a leaving group (e.g., a halogen) that is readily displaceable by nucleophilic compounds without competing elimination. Suitable primary halogen-terminated polyolefins can be prepared, for example, via in situ chain end functionalization of living carbocationic polyolefins by direct addition of alkoxybenzene derivatives to a living polymerization, or alternatively, to a pre-formed tert-chloride-terminated polyolefin activated by a Lewis acid, or alternatively to an olefin-terminated polyolefin activated by a protic/Lewis acid combination. Other methods for forming suitable primary halogen-terminated polyolefins are described in Martinez-Castro, N.; Morgan, D. L.; Storey, R. F. *Macromolecules* 2009, 42, 4963-4971, which is incorporated by reference herein.

In some embodiments, methods for preparing polyolefin dispersants can comprise (a) generating a quasiliving polyolefin in a reversible deactivation-type living polymerization; (b) adding to the reversible deactivation-type living polymerization of step (a) a quenching agent defined by Formula V to generate a phenoxy-quenched precursor;

Formula V

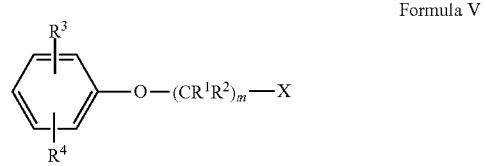

wherein $R^1$, $R^2$, $R^3$, $R^4$, and m are as defined above with respect to Formula I, and X is a leaving group; (c) reacting the phenoxy-quenched precursor with a polyamine to form a polyamine-capped precursor; and (d) reacting the polyamine-capped precursor with an anhydride to form the polyolefin dispersant.

Methods of generating quasiliving polyolefins in reversible deactivation-type living polymerizations are known in the art. Non-limiting examples of such methods are described in WO 2006/110647 A1, both of which are incorporated by reference herein. In some embodiments, the reversible deactivation-type living polymerization can be a reversible deactivation-type living carbocationic polymerization, also referred to as a quasiliving carbocationic polymerization.

In some embodiments, a monomer, an initiator, and a Lewis acid are used. In some embodiments, an electron donor, common ion salt, and/or common ion salt precursor is/are used. In some embodiments, the ionized polyolefin is a quasiliving carbocationic polyisobutylene. In some embodiments, the quasiliving carbocationic polyolefin can be generated from a preformed polyolefin.

In some embodiments, step (a) can comprise combining a Lewis acid and a monomer with an initiator in the presence of an electron donor, common ion salt, common ion salt precursor, or combination thereof.

In some embodiments, the Lewis acid can be a non-protic acid. In some embodiments, the Lewis acid can be a metal halide or non-metal halide. In certain embodiments, the Lewis acid is a metal halide. For example, the Lewis acid can be a titanium (IV) halide (e.g., titanium tetrabromide, titanium tetrachloride), a zinc (II) halide (e.g., zinc chloride), a tin (IV) halide, or an aluminum (III) halide (e.g., aluminum trichloride, ethyl aluminum dichloride, methyl aluminum dichloride). In certain embodiments, the Lewis acid can be an antimony (VI) halide, a gallium (III) halide, or a boron (III) halide (e.g., boron trichloride). Other suitable Lewis acids include trialkyl aluminum compounds, such as trimethyl aluminum. In some cases, a single Lewis acid can be used. In other cases, a mixture of two or more Lewis acids can be used.

The initiator can be a compound or polyolefin with one, or more than one, end group capable of initiating a cationic olefin polymerization. For example, the initiator can be a compound of formula $(X'-CR^aR^b)_rR_c$ wherein $R_a$ and $R_b$ are independently hydrogen, alkyl, aryl, alkaryl, or aralkyl, provided that at least one of $R_a$ or $R_b$ is not hydrogen; $R_c$ is an aliphatic or aromatic univalent or polyvalent radical with valence r, wherein r is an integer from one to 4; and X' is acyl, alkoxy, hydroxy, or halogen. In some embodiments, $R_a$, $R_b$, and $R_c$ are hydrocarbon groups containing one carbon atom to about 20 carbon atoms. In some embodiments, $R_a$, $R_b$, and $R_c$ are hydrocarbyl groups containing one carbon atom to about 8 carbon atoms. In some embodiments, X' is a halogen. In some embodiments, X' is chloride. In some embodiments, the structure of $R_a$, $R_b$, and $R_c$ mimics the growing species or monomer. In some embodiments, the structure is a 1-halo-1-tolylethane initiator for polystyrene or a 2-halo-2,4,4-trimethyl pentane initiator for polyisobutylene. In some embodiments, $R_a$, $R_b$, and $R_c$ are each hydrocarbon groups containing one carbon atom to about 10 carbon atoms for the initiation of an isobutylene polymerization. In some embodiments, the initiator is a cumyl, dicumyl or tricumyl halide. In some embodiments, r is 1 or 2.

Examples of suitable initiators include 2-chloro-2-phenylpropane, i.e., cumyl chloride; 1,4-di(1-chloro-1-methylethyl)benzene, i.e., di(cumylchloride); 1,3,5-tri(1-chloro-1-methylethyl)benzene, i.e., tri(cumylchloride); 2-acetoxy-2-phenylpropane, i.e., cumyl acetate; 2-propionyloxy-2-phenyl propane, i.e., cumyl propionate; 2-methoxy-2-phenylpropane, i.e., cumyl methylether; 1,4-di(1-methoxy-1-methylethyl)benzene, i.e., di(cumyl methylether); 1,3,5-tri(1-methoxy-1-methylethyl)benzene, i.e., tri(cumyl methylether); 2-chloro-2,4,4-trimethyl pentane (TMPCl); 2-chloro-2,4,4,6,6-pentamethylheptane (PMHCl); 1,3-di(1-chloro-1-methylethyl)benzene; 2,6-dichloro-2,4,4,6-tetramethylheptane; and 1,3,-di(1-chloro-1-methylethyl)-5-tert-butylbenzene (bDCC).

The initiator can be mono-functional, bi-functional, or multi-functional. Examples of suitable mono-functional initiators include 2-chloro-2-phenylpropane, 2-acetoxy-2-phenylpropane, 2-propionyloxy-2-phenylpropane, 2-methoxy-2-phenylpropane, 2-ethoxy-2-phenylpropane, 2-chloro-2,4, 4-trimethylpentane, 2-acetoxy-2,4,4,-trimethylpentane, 2-propionyloxy-2,4,4-trimethylpentane, 2-methoxy-2,4,4-trimethylpentane, 2-ethoxy-2,4,4-trimethylpentane, 2-chloro-2,4,4,6,6-pentamethylheptane, 2-acetoxy-2,4,4,6, 6-pentamethylheptane, 2-propionyloxy-2,4,4,6,6-pentamethylheptane, 2-methoxy-2,4,4,6,6-pentamethylheptane, and 2-ethoxy-2,4,4,6,6-pentamethylheptane. In some embodiments, the initiator can be 2-chloro-2,4,4-trimethylpentane. Examples of suitable bi-functional initiators include 1,3-di(1-chloro-1-methylethyl)benzene, 1,3-di(1-methoxy-1-methylethyl)benzene, 1,4-di(1-chloro-1-methylethyl)benzene, 1,4-di(1-methoxy-1-methylethyl)benzene, 1,3-di(1-chloro-1-methylethyl)-5-tert-butylbenzene, 1,3-di (1-methoxy-1-methylethyl)-5-tert-butylbenzene, 2,6-dichloro-2,4,4,6-tetramethylheptane, or 2,6-dimethoxy-2,4,4, 6-tetramethylheptane. In some embodiments, the initiator is 1,3-di(1-chloro-1-methylethyl)-5-tert-butylbenzene or 2,6-dichloro-2,4,4,6-tetramethylheptane. In some embodiments, the initiator can be 1,3-di(1-chloro-1-methylethyl)-5-tert-butylbenzene. Examples of suitable multi-functional (tri-functional) initiators include 1,3,5-tri(1-chloro-1-methylethyl)benzene, 1,3,5-tri(1-bromo-1-methylethyl)benzene, or 1,3,5-tri(1-methoxy-1-methylethyl)benzene.

The monomer can be a hydrocarbon monomer, i.e., a compound containing only hydrogen and carbon atoms, including but not limited to, olefins and diolefins, and those having from about 2 to about 20 carbon atoms. In some embodiments, such compounds have from about 4 to about 8 carbon atoms. Examples of suitable monomers include isobutylene, styrene, beta-pinene, isoprene, butadiene, or substituted compounds of the preceding types. In some embodiments, the monomer is isobutylene, 2-methyl-1-butene, 3-methyl-1-butene, 4-methyl-1-pentene, or styrene. In some embodiments, the monomer is isobutylene. If desired for a particular application, mixtures of monomers can be used.

If desired, electron donors can be used in conjunction with the reversible deactivation-type living polymerizations described herein. In some embodiments, the electron donor can be capable of complexing with Lewis acids. In some embodiments, the electron donor can be a base and/or nucleophile. In some embodiments, the electron donor can be capable of abstracting or removing a proton. In some embodiments, the electron donor can be an organic base. In some embodiments, the electron donor can be an amide (e.g., N,N-dimethylformamide, N,N-dimethylacetamide, or N,N-diethylacetamide). In some embodiments, the electron donor can be a sulfoxide (e.g., dimethyl sulfoxide). In some embodiments, the electron donor can be an ester (e.g., methyl acetate or ethyl acetate). In some embodiments, the electron donor can be a phosphate compound (e.g., trimethyl phosphate, tributyl phosphate, or triamide hexamethylphosphate). In some embodiments, the electron donor can be an oxygen-containing metal compound (e.g., tetraisopropyl titanate). In some embodiments, the electron donor is pyridine or a pyridine derivative (e.g., 2,6-di-tert-butylpyridine, 2,6-lutidine, 2,4-lutidine, 2,4,6-trimethylpyridine, 2-methylpyridine, or pyridine). Other suitable electron donors include N,N-dimethylaniline or N,N-dimethyltoluidine.

If desired, common ion salts or salt precursors may be optionally added to the reaction mixture in addition to or in replacement of the electron donor. In some embodiments, such salts may be used to increase the ionic strength, suppress free ions, and interact by ligand exchange. Examples of suitable common ion salts or salt precursors include tetra-n-butylammonium chloride, tetra-n-butylammonium bromide, tetra-n-butylammonium iodide.

Step (b) can comprise adding to the reversible deactivation-type living polymerization of step (a) a quenching agent defined by Formula V to generate a phenoxy-quenched precursor. In some embodiments, step (b) is performed for about 5 minutes to about 120 minutes. In some embodiments, step (b) is performed for about 15 minutes to about 90 minutes. In some embodiments, step (b) is performed for about 30 minutes to about 60 minutes.

In some embodiments, prior to step (b), the reversible deactivation-type living polymerization of step (a) is terminated and subsequently reactivated zero, one, or more times at a desired time. In some embodiments, the reversible deactivation-type living polymerization of step (a) is terminated and subsequently reactivated zero times, i.e., after generation of the quasiliving polyolefin of step (a), the reversible deactivation-type living polymerization of step (a) is not terminated at any time prior to step (b). In some embodiments, the reversible deactivation-type living polymerization of step (a) is terminated and subsequently reactivated one time.

In some embodiments, the quenching agent defined by Formula V is added after high conversion of the monomer. In particular embodiments, the quenching agent defined by Formula V is added after 80%, 85%, 90%, 95%, 97%, 99%, or 99.9% of the monomer has been polymerized into the quasiliving polyolefin.

Step (c) can comprise reacting the phenoxy-quenched precursor with a polyamine to form a polyamine-capped precursor. Examples of suitable polyamines include 1-(2-aminoethyl)piperazine, 4-[2-(1-piperazinyl)ethyl]-1-piperazineethanamine, diethylenetriamine, N-methyl-1,3-diaminopropane, triethylenetetramine (TETA), triethylenepentamine (TEPA), pentaethylenehexamine (PEHA), hexaethyleneheptamine (HEHA), N-phenyl-p-phenylenediamine, and N-benzylethylenediamine.

If necessary to control reactivity of the polyamine with the phenoxy-quenched precursor, one or more amine groups of the polyamine can be protected prior to reaction with the phenoxy-quenched precursor. A wide variety of amine protecting groups are known in the art, and may be selected based on the overall structure of the polyamine as well as the structure of the phenoxy-quenched precursor. See, for example, Greene, et al., *Protective Groups in Organic Synthesis*, John Wiley and Sons, Third Edition, 1999, hereby incorporated by reference. By way of example, protection of primary amines within a polyamine can be accomplished by reaction of the polyamine with an excess of a ketone, for example, methyl isobutyl ketone (MIBK), at reflux to form the imine derivative (Schiff base) while leaving the secondary and tertiary amines intact. In these embodiments, step (c) can comprise reacting the phenoxy-quenched precursor with the protected polyamine to form a protected polyamine-capped precursor, and deprotecting the protected polyamine-capped precursor to form the polyamine-capped precursor.

Step (d) can comprise reacting the polyamine-capped precursor with an anhydride to form the polyolefin dispersant. Any suitable anhydride can be used. In some embodiments, the anhydride can comprise a cyclic anhydride.

For example, in some cases the anhydride can comprise a cyclic anhydride defined by the structure below

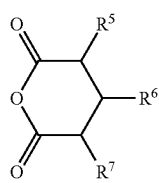

where $R^5$, $R^6$, and $R^7$ are each, independently, H, halogen, alkyl, alkoxy, aryl, alkylaryl, or cycloalkyl; or wherein $R^5$ and $R^6$, together with the atoms to which they are attached, $R^6$ and $R^7$, together with the atoms to which they are attached, or both $R^5$ and $R^6$ and $R^6$ and $R^7$, together with the atoms to which they are attached, form a 5-8 membered substituted or unsubstituted aromatic or non-aromatic ring. For example, the anhydride can comprise one of the following

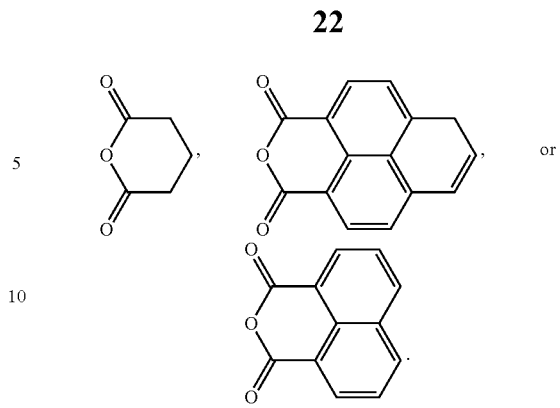

In other embodiments, the anhydride can comprise a cyclic anhydride defined by the structure below Formula IV

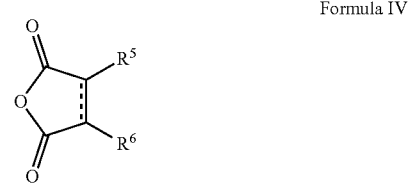

where $R^5$ and $R^6$ are each, independently, H, halogen, alkyl, alkoxy, aryl, alkylaryl, or cycloalkyl, or wherein $R^5$ and $R^6$, together with the atoms to which they are attached, form a 5-8 membered substituted or unsubstituted aromatic or non-aromatic ring. For example, the anhydride can comprise one of the following

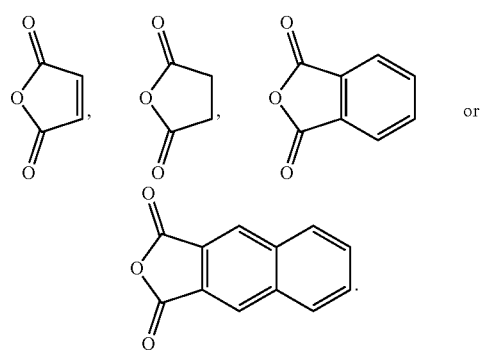

Other suitable anhydrides include, for example, dianhydrides. Examples of suitable dianhydrides include pyromellitic dianhydride; dianhydrides derived from fused aromatic systems, such as naphthalene-2,3,6,7-tetracarboxylic acid dianhydride, naphthalene-1,2,5,6-tetracarboxylic acid dianhydride and perylene-3,4,9,10-tetracarboxylic acid dianhydride, and dianhydrides wherein the anhydride groups are attached to different aromatic (e.g., benzene) rings which are linked together, such as diphenyl-3,3,4,4-tetracarboxylic acid dianhydride, diphenyl-2,2',3,3'-tetracarboxylic acid dianhydride, 2,2-bis(3,4-dicarboxyphenyl(propane dianhydride, bis(3,3-dicarboxyphenyl) ether dianhydride, bis(3,4dicarboxyphenyl) sulphone dianhydride, benzophenone-2,2,3,3'-tetracarboxylic acid dianhydride and benzophenone 3,3,4,4-tetracarboxylic acid dianhydride. In certain embodiments, the dianhydride can comprise pyromellitic dianhydride. In certain embodiments, the dianhydride can comprise a naphthalenetetracarboxylic dianhydride.

Other suitable anhydrides include polycyclic anhydrides. The polycyclic anhydride can comprise a molecular scaffold bearing three or more cyclic anhydrides groups. In some embodiments, the molecular scaffold can comprise an aromatic system substituted with three or more cyclic anhydride groups. In some embodiments, the molecular scaffold can comprise a polymer substituted with three or more cyclic anhydride groups (e.g., a polymer or copolymer bearing three or more cyclic anhydride groups as sidechains and/or along the polymer backbone). For example, in some embodiments, the polycyclic anhydride can be a polymer or copolymer comprising maleic anhydride monomer units. In certain embodiments, the polycyclic anhydride can be a copolymer that comprises maleic anhydride monomers and one or more additional monomers derived from polymerization of an ethylenically-unsaturated monomer. Examples of suitable ethylenically-unsaturated monomers include meth(acrylate) monomers, vinyl aromatic monomers having up to 20 carbon atoms (e.g., styrene), vinyl esters of carboxylic acids comprising up to 20 carbon atoms, (meth) acrylonitriles, vinyl halides, vinyl ethers of alcohols comprising 1 to 10 carbon atoms, aliphatic hydrocarbons having 2 to 8 carbon atoms and one or two double bonds, (meth) acrylamides, (meth)acrylamide derivatives, and combination of these monomers. As used herein, "(meth)acryl . . . " includes acryl . . . , methacryl . . . , diacryl . . . , and dimethacryl . . . . For example, the term "(meth)acrylate monomer" includes acrylate, methacrylate, diacrylate, and dimethacrylate monomers. Meth)acrylate monomers can include esters of $\alpha,\beta$-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with C1-C20, C1-C12, C1-C8, or C1-C4 alkanols). By way of example, in some cases the polycyclic anhydride can be poly(styrene-alt-maleic anhydride)).

Lubricating Oil Compositions

As discussed above, the polyolefin dispersants described herein can be used as detergent and dispersant additives in lubricating oils. When employed in this manner, the polyolefin dispersants are usually present in the lubricant oil composition in an amount of from 0.2 to 10 percent by weight (e.g., from 0.5 to 8 percent by weight, or from 1 to 6 percent by weight), based on the total weight of the lubricant oil composition. The lubricating oil in these compositions may be, for example, mineral oil or synthetic oils of lubricating viscosity. In certain embodiments, the lubricating oil can be an oil that is suitable for use in the crankcase of an internal combustion engine. Crankcase lubricating oils ordinarily have a viscosity of about 1300 CSt 0° F. to 22.7 CSt at 210° F. (99° C.). The lubricating oils may be derived from synthetic or natural sources. Mineral oil for use as the base oil can include paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenated liquid oligomers of C6 to C12 alpha olefins such as 1-decene trimer. Likewise, alkyl benzenes of proper viscosity, such as didodecyl benzene, can be used. Blends of hydrocarbon oils with synthetic oils are also useful.

Also provided are lubricating oil concentrates. The concentrates can include from 90 to 10 weight percent, (e.g., from 90 to 50 weight percent) of an oil of lubricating viscosity, based on the total weight of the concentrate composition, and from 10 to 90 weight percent (e.g., from 10 to 50 weight percent), of a polyolefin dispersant described herein, based on the total weight of the concentrate composition. Typically, the concentrates contain sufficient diluent to make them easy to handle during shipping and storage. Suitable diluents for the concentrates include any inert diluent, preferably an oil of lubricating viscosity, such that the concentrate may be readily mixed with lubricating oils to prepare lubricating oil compositions.

Suitable lubricating oils which can be used as diluents typically have viscosities in the range from about 35 to about 500 Saybolt Universal Seconds (SUS) at 100° F. (38° C.), although an oil of lubricating viscosity may be used.

Other additives that can be included in the lubricating oil compositions include rust inhibitors, foam inhibitors, corrosion inhibitors, metal deactivators, pour point depressants, antioxidants, and a variety of other well-known additives. It is also contemplated the polyolefin dispersants described herein be employed as dispersants and detergents in hydraulic fluids, marine crankcase lubricants, and the like. When so employed, the polyolefin dispersants can be present in an amount of from 0.1 to 10 weight percent (e.g., from 0.5 to 8 weight percent) by weight to the oil.

Fuel Compositions

The polyolefin dispersants described herein can also be used as fuel additives. When used in fuels, the proper concentration of the additive necessary in order to achieve the desired detergency is dependent upon a variety of factors including the type of fuel used, the presence of other detergents or dispersants or other additives, etc. Generally, however, the range of concentration of the polyolefin dispersants in the base fuel can be from 10 to 10,000 weight parts per million (e.g., from 30 to 5000 parts per million weight parts per million) base fuel. If other detergents are present in the composition, a lesser amount of the additive may be used.

The polyolefin dispersants may be formulated as a fuel concentrate, using an inert stable oleophilic organic solvent boiling in the range of from 150° F. to 400° F. In some cases, an aliphatic or an aromatic hydrocarbon solvent is used, such a benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive. In the fuel concentrate, the polyimide will be ordinarily at least 5 percent by weight and generally not exceed 70 percent by weight, preferably from 5 to 50 and more preferably from 10 to 25 weight percent.

By way of non-limiting illustration, examples of certain embodiments of the present disclosure are given below.

EXAMPLES

Materials and Methods Hexane (anhydrous, 95%), titanium tetrachloride (TiCl$_4$) (99.9%), 2,6-lutidine (redistilled, 99.5%), (3-bromopropoxy)benzene (96%), tetrahydrofuran (THF) (anhydrous, 99.9%), methanol (anhydrous, 99.8%), acetone (anhydrous, 99%), methyl isobutyl ketone (99%), 1-(2-aminoethyl)piperazine (99%), phthalic anhydride (99%), 1,8-naphthalic anhydride (99%), glutaric anhydride (95%), maleic anhydride (99%), cumene-terminated poly (styrene-co-maleic anhydride) (M$_n$≈1,600 g·mol$^{-1}$, acid number: 465-496 mg KOH/g), silver trifluoroacetic acid (AgTFA), sodium trifluoroacetate (NaTFA) (98%), dithranol (98.5%), diethylenetriamine (DETA, 99%), methylene chloride-$d_2$ ($CD_2Cl_2$) (99.8%), and chloroform-d ($CDCl_3$) were purchased from Sigma-Aldrich Co. and used as received. Anhydrous magnesium sulfate ($MgSO_4$) was purchased and used as received from Fisher Scientific. Isobutylene (IB) (99%) and methyl chloride (99.5%) (both Gas and Supply Co., Hattiesburg, Miss.) were dried by passing the gaseous reagent through a column of $CaSO_4$/molecular sieves/$CaCl_2$) and condensing within a $N_2$-atmosphere glovebox immediately prior to use. trans-2-[3-(4-tert-Butylphenyl)-2-methyl-2-propenylidene]malononitrile (DTCB) was purchased from Tokyo Chemical Industry Co. and used as received. 2-Chloro-2,4,4-trimethylpentane (TMPCl) was prepared by bubbling HCl gas through neat 2,4,4-trimethyl-1-pentene (99%, Sigma-Aldrich) at 0° C. The HCl-saturated TMPCl was stored at 0° C. and immediately prior to use was neutralized with $NaHCO_3$, dried over anhydrous $MgSO_4$, and filtered. RLOP 100N Base Oil was provided by Chevron Oronite. Vulcan XC-72R was purchased and used as received from Fuel Cell Store.

Nuclear magnetic resonance (NMR) spectra were obtained using a 300 MHz Varian Mercuryplus NMR (VNMR 6.1C) spectrometer. Standard $^1H$ and $^{13}C$ pulse sequences were used. Composite pulse decoupling was used to remove proton coupling in $^{13}C$ spectra. All $^1H$ chemical shifts were referenced to TMS (0 ppm). Samples were prepared by dissolution in $CD_2Cl_2$ (20-50 mg/mL) and charging this solution to a 5 mm NMR tube.

Number-average molecular weights ($M_n$) and polydispersities (PDI=$M_w/M_n$) were determined with a gel-permeation chromatography (GPC) system consisting of a Waters Alliance 2695 separations module, an online multiangle laser light scattering (MALLS) detector fitted with a 20 mW laser operating at 658 nm (miniDAWN TREOS, Wyatt Technology Inc.), an interferometric refractometer (Optilab rEX, Wyatt Technology Inc.) operating at 35° C. and 685 nm, and two PLgel (Polymer Laboratories Inc.) mixed E columns (pore size range 50-103 A°, 3 μm bead size). Freshly distilled THF served as the mobile phase and was delivered at a flow rate of 1.0 mL/min. Sample concentrations were ca. 15-20 mg of polymer/mL of THF, and the injection volume was 100 μL. The detector signals were simultaneously recorded using ASTRA software (Wyatt Technology Inc.), and absolute molecular weights were determined by MALLS using a do/dc calculated from the refractive index detector response and assuming 100% mass recovery from the columns.

Real-time ATR-FTIR monitoring of isobutylene polymerizations was performed using a ReactIR 4000 (Mettler-Toledo) integrated with a $N_2$-atmosphere glovebox (MBraun Labmaster 130). Isobutylene conversion during polymerization was determined by monitoring the area, above a two-point baseline, of the absorbance centered at 887 $cm^{-1}$, associated with the $=CH_2$ wag of isobutylene.

Fourier transform infrared spectroscopy (FTIR) was used to determine the presence of imide groups in the PIB-PzEA-derived dispersants as well as the lack of anhydride and amic-acid groups. FTIR spectra of the PIB-PzEA-derived dispersants were acquired between sodium chloride salt windows using a Nicolet 8700 spectrometer and Omnic software. Spectra were taken with a resolution of 4 $cm^{-1}$ by accumulating a minimum of 128 scans per run. Nitrogen was constantly purged through the attachment to reduce interference of $CO_2$ and water. Absorbances at 1770 $cm^{-1}$ and 1710 $cm^{-1}$ were indicative of the presence of imide groups while absence of stretches at 18600 $cm^{-1}$ and 1785 $cm^{-1}$ were indicative of the lack of anhydride and amic acid groups.

Matrix-assisted laser desorption/ionization time-of-flight mass spectrometry (MALDI-TOF MS) was performed using a Bruker Microflex LRF MALDI-TOF mass spectrometer equipped with a nitrogen laser (337 nm) possessing a 60 Hz repetition rate and 50 μJ energy output. The PIB samples were prepared using the dried droplet method: separately prepared THF solutions of DCTB or dithranol matrix (20 mg/mL), PM sample (10 mg/mL), and AgTFA or NaTFA cationizing agent (10 mg/mL) were mixed in a volumetric ratio of matrix/sample/cationizing agent=4:1:0.2, and a 0.5 μL aliquot was applied to a MALDI sample target for analysis. The spectrum was obtained in the positive ion mode utilizing the Reflector mode microchannel plate detector and was generated as the sum of 900-1000 shots.

Dispersant adsorption onto carbon black via supernatant depletion assay was carried out with the use of a Perkin Elmer Lambda 35 UV/VIS spectrometer. Solutions ranging from 25-0.1 mg/mL of dispersant were prepared in dodecane followed by the careful addition of 75 mg of Vulcan XC-72R carbon black. The solutions were then sealed and vortexed for 15 minutes followed by high-speed mixing with the use of a FlackTek speed mixer DAC 400.1 FVZ and then lastly left on a continuous rotating mixer overnight for 16 h to achieve suitable dispersion of the carbon black. The samples were then centrifuged at 4000 rpm for 4 h to aid in the sedimentation of the carbon black and then the supernatant was carefully decanted into an empty vial for analysis to be analyzed by UV-VIS. The adsorption appearing at 286 nm, presumed to be due to the aromatic ring associated with the quenching moiety, was used to quantify the remaining dispersant concentration in the supernatant after contact with the carbon black.

Thermogravimetric analysis (TGA) experiments were performed on a Q50 (TA Instrument) thermogravimetric analyzer. The furnace atmosphere was defined by 10 $mL \cdot min^{-1}$ nitrogen. Samples were prepared by loading a platinum sample pan with 10-20 mg of material. The samples were subjected to a temperature ramp of 10° $C. \cdot min^{-1}$ from 10° C. to 600° C. The onset and midpoint degradation temperature were determined from the 5 wt % and 50 wt % loss temperatures after plateau from residual solvent loss, respectively.

Evaluation of the corrosiveness of base oil with PIB-PzEA-Phthalimide was conducted according to the method described in ASTM D6594-14 entitled "Standard Test Method for Evaluation of Corrosiveness of Diesel Engine Oil at 135° C.," which is hereby incorporated herein by reference in its entirety. Briefly, metal specimens (lead or copper) were placed in base oil containing 6 wt % PIB-PzEA-Phthalimide and heated at 135° C. for 168 h. Trace metal analysis of the oil was the conducted using inductively coupled plasma atomic emission spectroscopy (ICP-AES). Further corrosion testing was performed with a copper strip test was according to ASTM D130. Here, copper strips were heated in oil containing 6 wt % PIB-PzEA-Phthalimide at 100° C. for 3 h. At the end of the heating period, the copper strip was removed, washed, and the color and tarnish level assessed against the ASTM Copper Strip Corrosion Standard.

Fluoroelastomer compatibility testing using base oil with 6 wt % PIB-PzEA-Phthalimide was conducted using the DC-AK6 seal compatibility testing method. Here, elastomer samples were immersed in 270 g of base oil and heated at 150° C. for 168 h after which the sample was tested for volume variation, hardness variation, elongation at break, and tensile strength at break. Changes in properties were compared to that of reference elastomer samples.

EXAMPLES

Example 1: Synthesis of Primary Bromide-Terminated PIB (PIB-Br)

A primary bromide-terminated PIB homopolymer was synthesized under reversible deactivation-type living carbocation polymerization conditions using methodologies know in the art. This example involved in situ alkylation of (3-bromopropoxy)benzene by living polyisobutylene from a monofunctional initiator. Briefly, the polymerization/alkylation was performed within a $N_2$-atmosphere dry box equipped with a cryostat bath. To a 60/40 (v/v) mixture of hexane (655 mL)/methyl chloride (438 mL) at −60° C. were added 2,6-lutidine (0.53 mL, 0.49 g), 2-chloro-2,4,4-trimethylpentane (22.319 g), and isobutylene (374 mL, 257 g). The polymerization of isobutylene was catalyzed by the addition of $TiCl_4$ (4.15 mL, 7.18 g). The polymerization was complete in approximately 2.5 h, at which point (3-bromopropoxy)benzene (60.00 mL) was added, followed immediately by 28.77 mL (49.77 g) of $TiCl_4$. The quenching reaction was allowed to proceed overnight. Quantitative capping of the chain ends by (3-bromopropoxy)benzene was confirmed by $^1H$ NMR. The catalyst was destroyed by the addition of excess methanol, and the polymer was recovered after volatilization of the methyl chloride and precipitation from hexane into methanol. FIG. 1A shows the for the product. The number average molecular weight of the final polymer was $1.95 \times 10^3$ g/mol with a polydispersity of 1.12.

Example 2: Protection of 1-(2-aminoethyl)piperazine

The primary amine of 1-(2-aminoethyl)piperazine was protected by forming a Schiff base with methyl isobutyl ketone. Briefly, 1-(2-aminoethyl)piperazine (26.5 mL, 26.1 g) and methyl isobutyl ketone (900 mL) were charged into a 2 L, three-neck, round-bottom flask equipped with magnetic stirrer, heating mantle, reflux condenser and Dean-Stark trap, septa, and nitrogen inlet and outlet. The resulting solution was heated to reflux under continuous $N_2$ purge. After 4 h, quantitative removal of the water by-product (3.65 mL) was observed indicating quantitative formation of the Schiff base.

Example 3: Reaction of PIB-Br with Protected 1-(2-aminoethyl)piperazine

Once the formation of the Schiff base above was complete, solid $K_2CO_3$ (14.96 g) and a solution prepared from 60.20 g of PIB-Br and methyl isobutyl ketone (100 mL) was added to the reaction vessel. The solution was allowed to reflux for 4 h, at which point quantitative reaction was observed with the use of $^1H$ NMR by monitoring the shift of the methylene protons on the (3-bromopropoxy)benzene moiety from 4.08 to 3.98 ppm.

Example 4: Preparation of Polyisobutylene-piperazinylethylamine (PIB-PzEA)

Figure 1B:
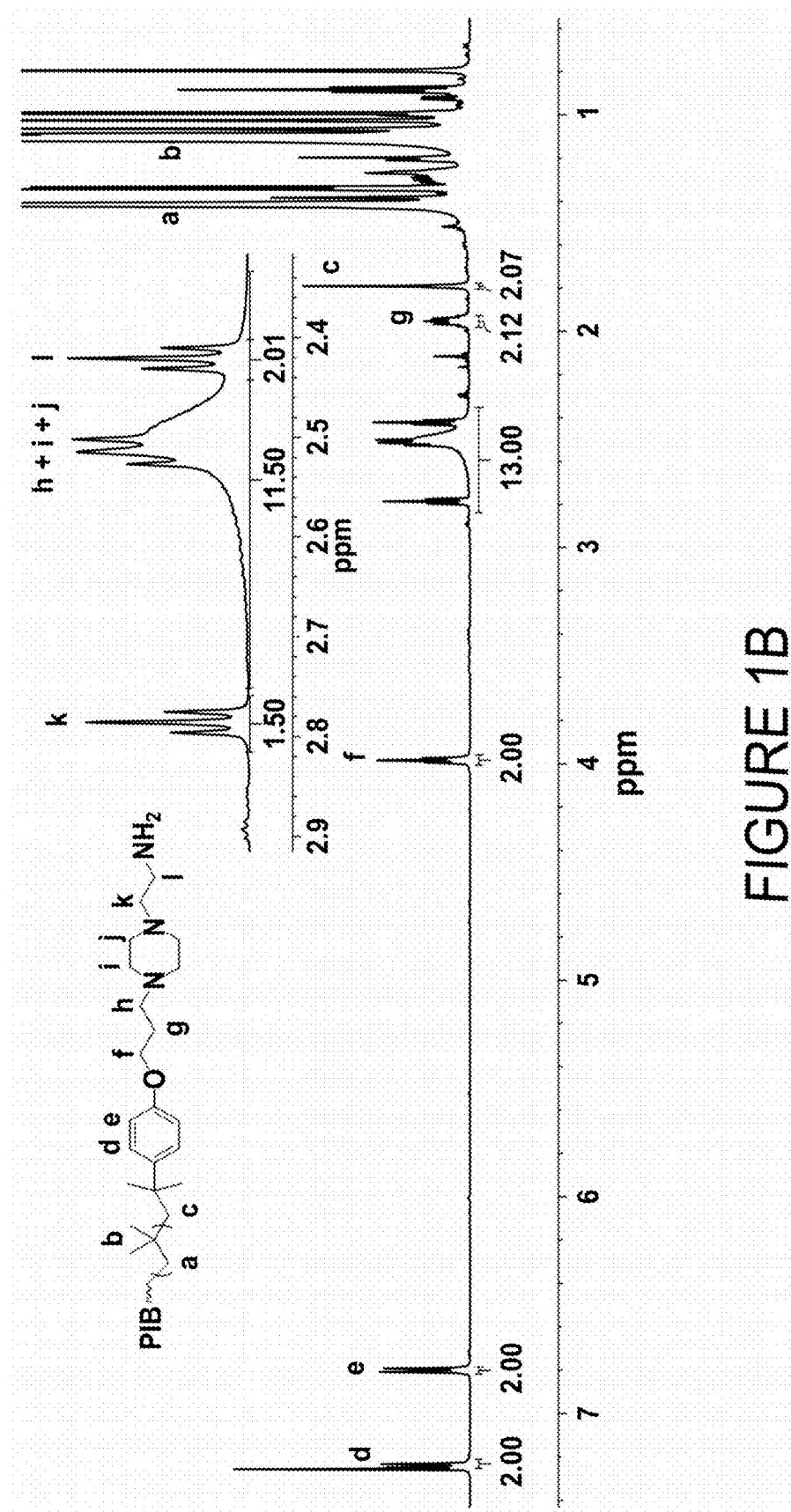
FIG. 1B is a $^1$H NMR (600 MHz, CD$_3$Cl, 22° C.) spectrum of polyisobutylene-piperazinylethylamine obtained by reaction of PIB-Br with MIBK-protected 1-(2-aminoethyl)piperazine and displacement of the MIBK protecting group by hydrolysis
Figure 2:
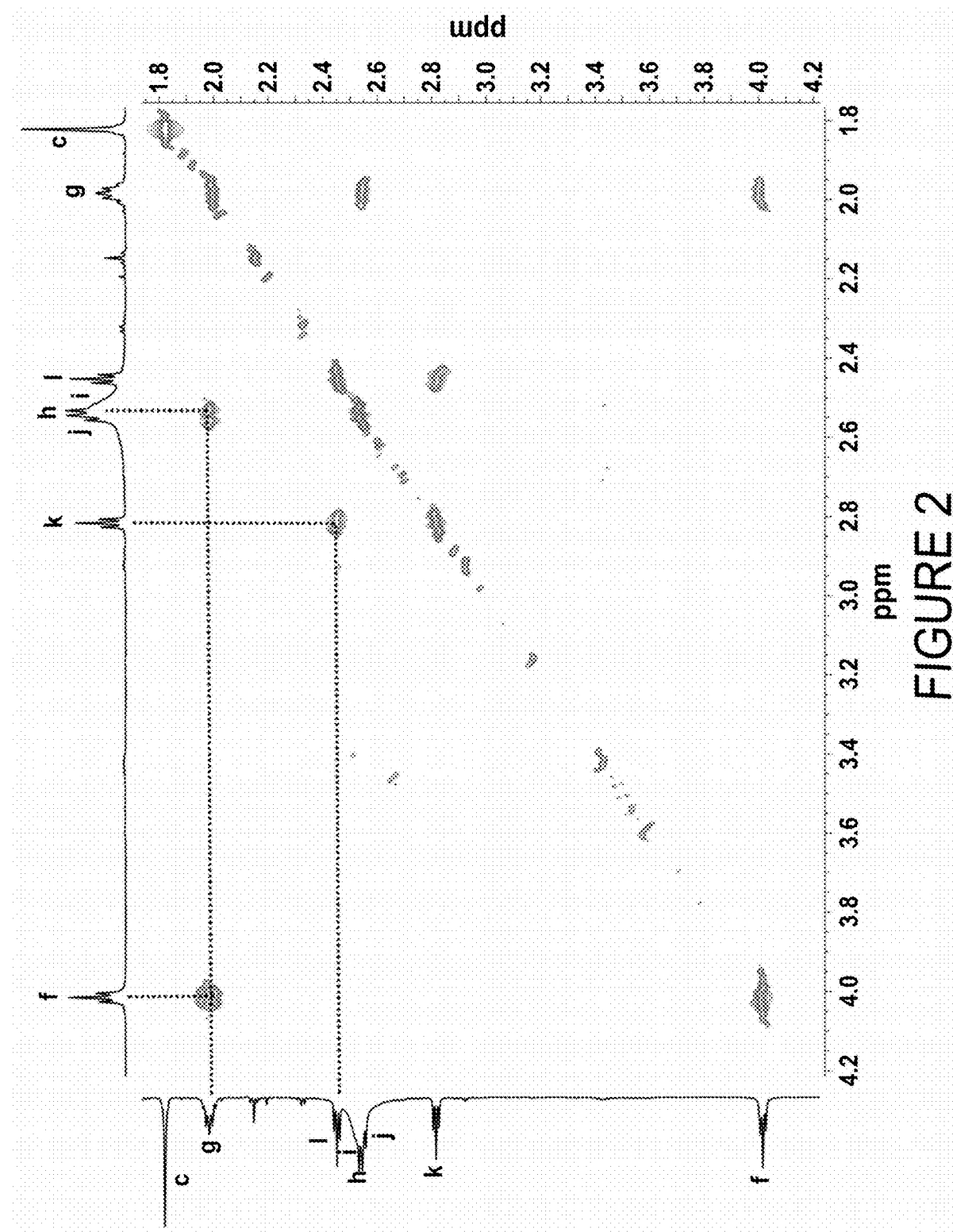
FIG. 2 is a homonuclear correlation spectroscopy (COSY) NMR (600 MHz, CD$_3$Cl, 22° C.) spectrum of polyisobutylene-piperazinylethylamine demonstrating cross-peak correlation that was used to identify peaks h, k, and l.
Figure 3:
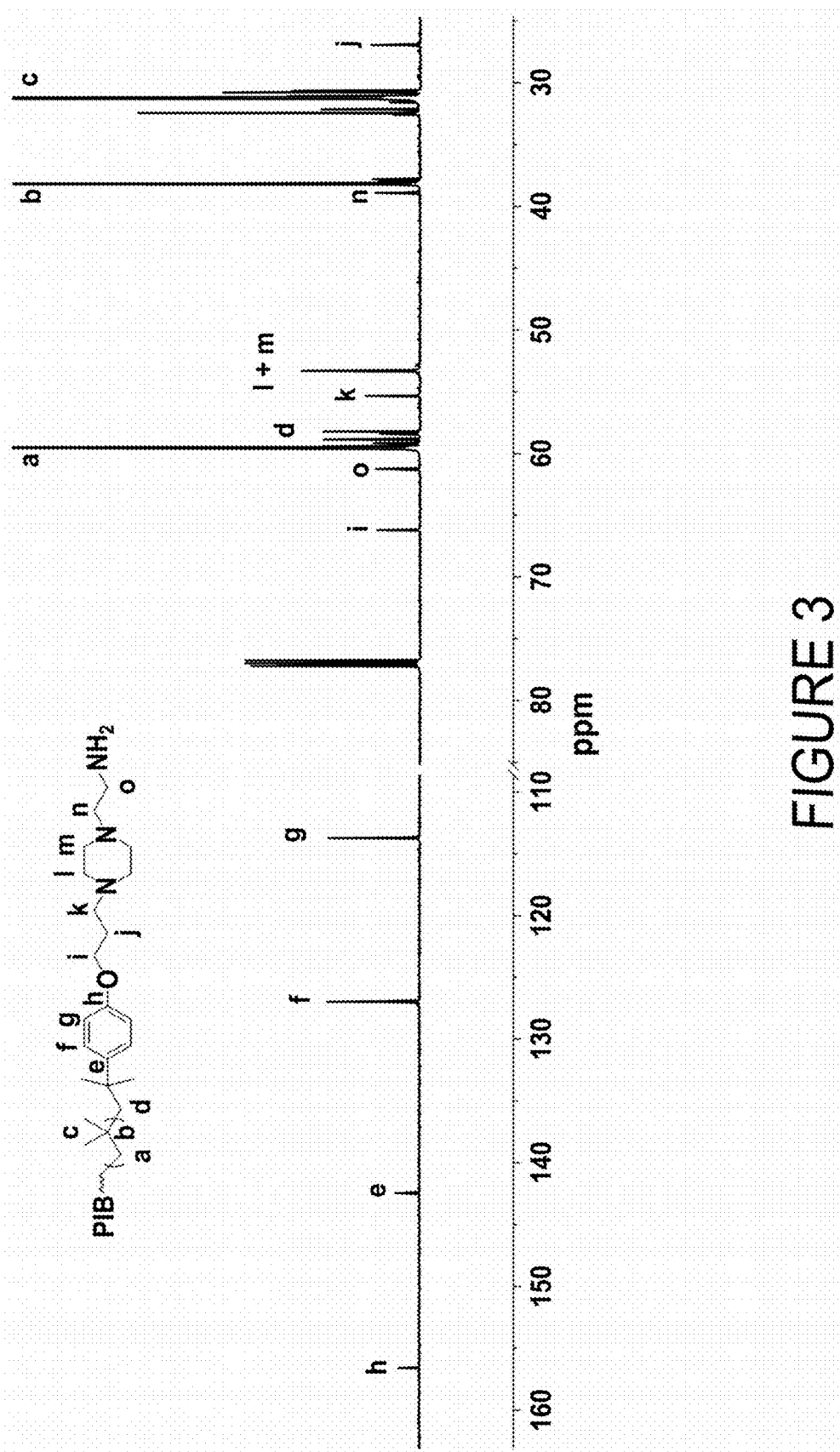
FIG. 3 is a $^{13}$C NMR (600 MHz, CD$_3$Cl, 22° C.) spectrum of polyisobutylene-piperazinylethylamine obtained by reaction of PIB-Br with MIBK-protected 1-(2-aminoethyl)piperazine and displacement of the MIBK protecting group by hydrolysis.

Residual methyl isobutyl ketone was removed from the reaction above under reduced pressure and replaced with a 2:1 mixture of tetrahydrofuran (500 mL) and water (250 mL). The solution was heated at 50° C. overnight to allow for quantitative hydrolysis of the Schiff base and release of methyl isobutyl ketone protecting group. Complete deprotection was confirmed through $^1H$ NMR by observing the disappearance of characteristic peaks associated with the Schiff base. The resulting polyisobutylene-piperazinylethylamine (PIB-PzEA) was separated from residual 1-(2-aminoethyl)piperazine by precipitation from hexane into methanol. The structure was confirmed by NMR analysis, as shown in FIGS. 1B, 2, and 3.

Example 5: Synthesis of PIB-PzEA-Phthalimide

PIB-PzEA (43.02 g) was charged to a reaction vessel equipped with a mechanical stirrer and dry nitrogen gas inlet and outlet. The neat PIB-PzEA was warmed to 65° C. under $N_2$ to reduce its viscosity. Stirring was activated, and 1.5 eq of solid phthalic anhydride (4.55 g) was added to the flask. The temperature was increased to 160° C., and the initially inhomogeneous mixture became homogeneous. The reaction was continued at 160° C. for 1.5 h. Reaction and ring-closure to form the imide was confirmed using $^1H$ NMR by observing the appearance of peaks at 7.82 and 7.73 ppm associated with the phenyl protons of the phthalimide group along with the shift of the penultimate methylene protons closest to the imide nitrogen from 2.79 to 3.78 ppm. See FIG. 4. The resulting PIB-PzEA-Phthalimide was separated from excess phthalic anhydride by precipitation from hexane into acetone. The product analytical results are as follows: nitrogen=1.56 wt %; total base number=20.2 mg KOH/g (ASTM D2896) and 9.9 mg KOH/g (ASTM D4739).

Example 6: Synthesis of PIB-PzEA-Naphthalimide

A scintillation vial equipped with a $N_2$ purge and a magnetic stir bar was charged with PIB-PzEA (1.142 g) and 1.15 eq of 1,8-naphthalic anhydride (0.120 g). The neat polymer was warmed to 65° C. under $N_2$ to reduce its viscosity and facilitate magnetic stirring. The vial contents were heated to 160° C. with stirring for 2.5 hours upon which the mixture was observed to bubble, indicating evolution of the water by-product. Reaction and ring-closure of the imide was confirmed using $^1H$ NMR by observing the appearance of peaks at 8.60, 8.21, and 7.73 ppm associated with the phenyl protons of the naphthalimide group along with the shift of the penultimate methylene protons closest to the imide nitrogen from 2.79 to 4.36 ppm. See FIG. 4. The resulting polymer was then separated from excess naphthalic anhydride by precipitation from hexane into acetone.

Example 7: Synthesis of PIB-PzEA-Glutarimide

Figure 4:
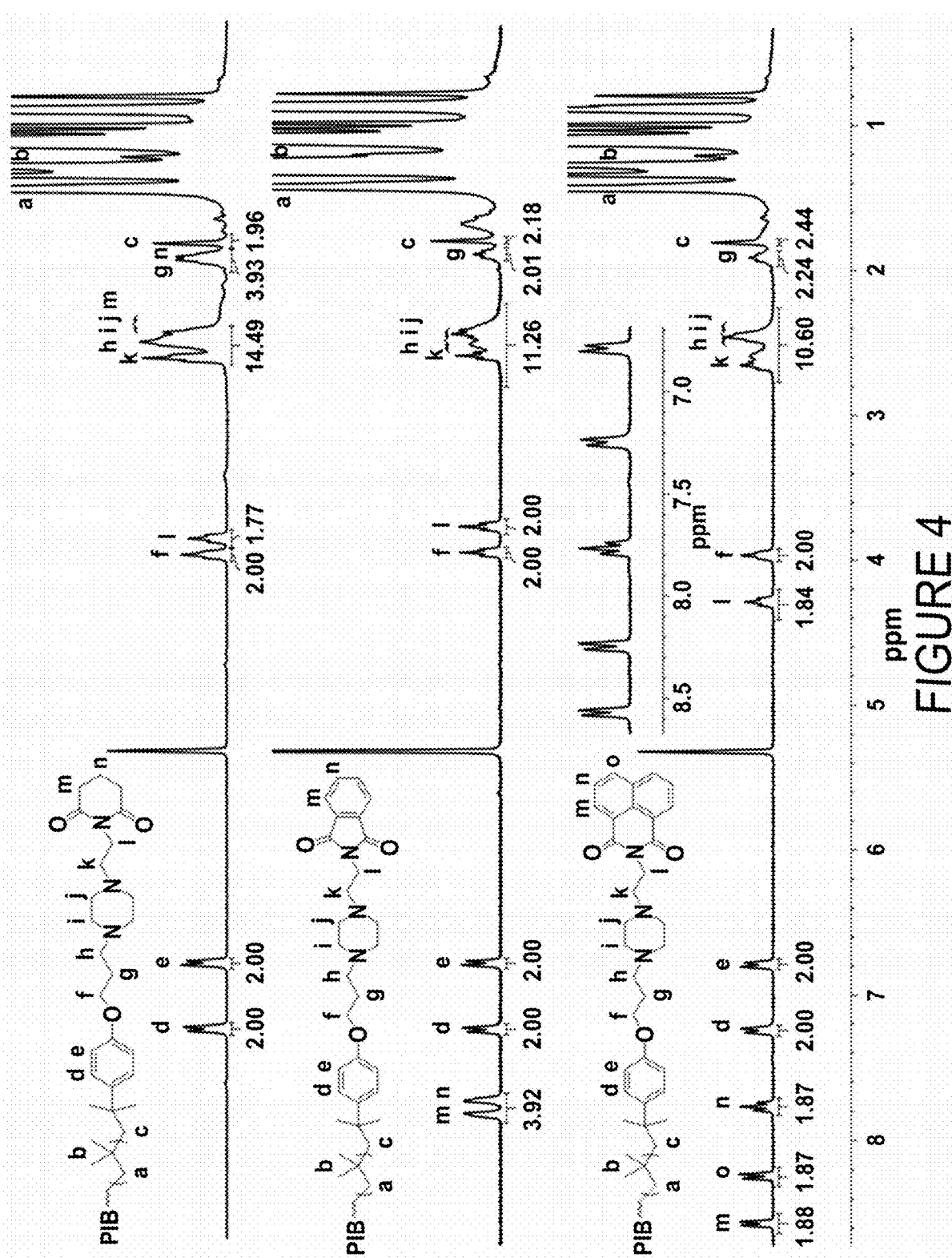
FIG. 4 compares the $^{13}$H NMR (300 MHz, CD$_2$Cl$_2$, 22° C.) spectra of polyisobutylene-piperazinylethylamine-glutarimide (PIB-PzEA-Glutarimide) (top trace), polyisobutylene-piperazinylethylamine-phthalimide (PIB-PzEA-Phthalimide) (middle trace) and polyisobutylene-piperazinylethylamine-naphthalimide (PM-PzEA- Naphthalimide) (bottom trace) obtained by reaction of primary amine-terminated PIB-PzEA with respective anhydrides.

A 10 mL round bottom flask was charged with a magnetic stirrer, 1.152 g (0.55 mmol) of PIB-PzEA, and 0.120 g (0.89 mmol) of glutaric anhydride. The flask was stoppered with a strong $N_2$ purge and the reaction was heated to 160° C. for 2 hours. Upon cooling to room temperature, the PIB-PzEA-Glutarimide was collected and purified by dissolution into hexane, precipitation into anhydrous acetone, and vacuum stripping at 40° C. The structure was confirmed by NMR analysis, as shown in FIG. 4.

Example 8: Synthesis of PIB-PzEA-Maleimide

Maleic anhydride (0.053 g) and tetrahydrofuran (15 mL) were charged into a 50 mL, 2-neck, round-bottom flask equipped with magnetic stirrer, heating mantle, reflux condenser and Dean-Stark trap, septa, and nitrogen inlet and outlet. The resulting solution was cooled to 0° C. Next, 0.85 eq of PIB-PzEA (1.006 g) dissolved in tetrahydrofuran (5 mL) was added dropwise, and the solution was stirred for an additional 30 min. The solution was then allowed to warm to room temperature and subsequently heated to reflux for 2 h. Tetrahydrofuran was then distilled from the flask under vacuum and replaced with dodecane (10 mL). The resulting solution was heated at 160° C. under $N_2$ for 1.5 h, and the water of imidization was separated using a Dean-Stark apparatus. Reaction and ring-closure of the imide was confirmed using $^1$H NMR by observing the appearance of a peak at 6.69 ppm associated with the olefinic protons of the maleimide moiety along with the shift of the penultimate methylene protons closest to the imide nitrogen from 2.79 to 3.65 ppm. The resulting PIB-PzEA-Maleimide was then separated from excess maleic anhydride by precipitation from hexane into acetone.

Example 9: Synthesis of PIB-PzEA-Pyromellitimide

Figure 5:
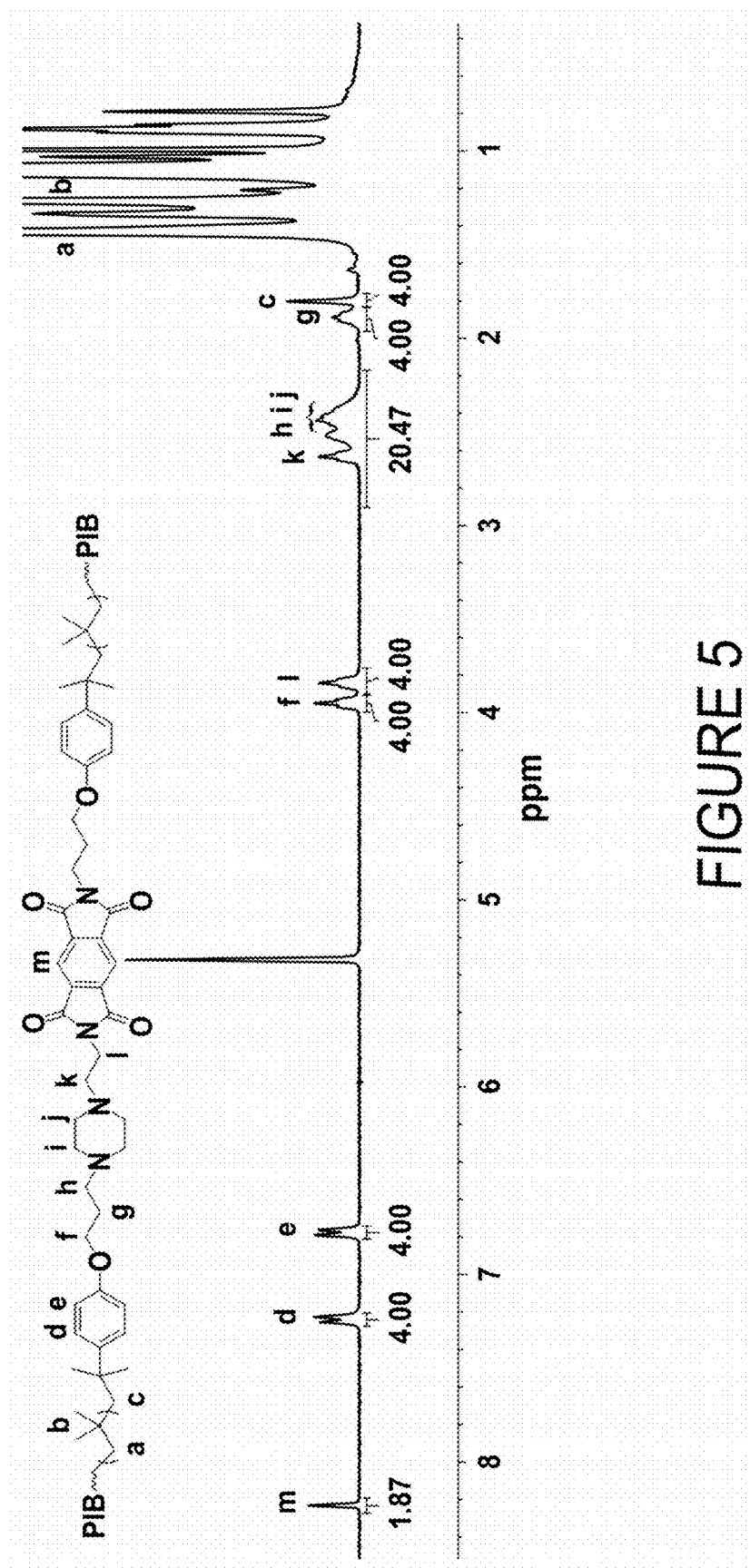
FIG. 5 is the $^1$H NMR (300 MHz, $CD_2Cl_2$, 22° C.) spectrum of polyisobutylene-piperazinylethylamine-pyromellitimide (PM-PzEA-Pyromellitimide) obtained by reaction of two equivalents of PIB-PzEA with one equivalents of pyromellitic dianhydride.
Figure 6:
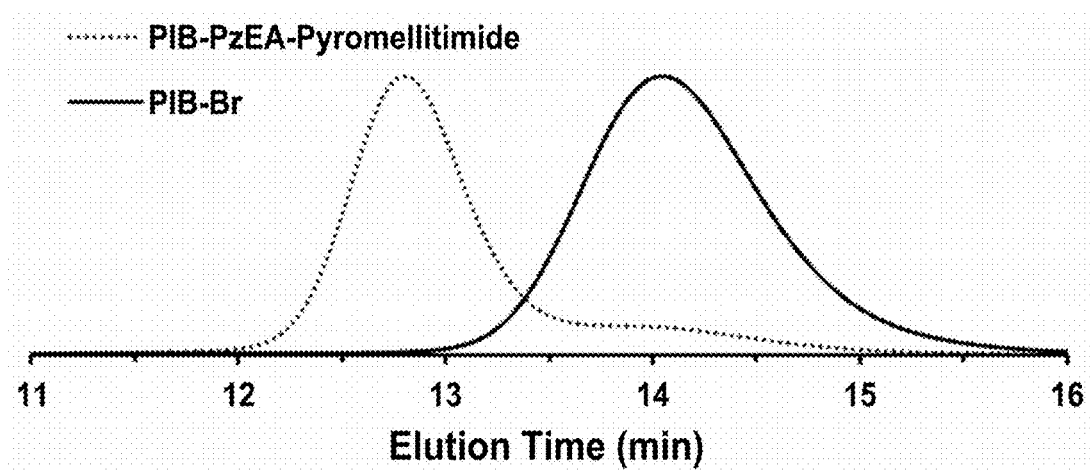
FIG. 6 is the GPC trace of polyisobutylene-piperazinylethylamine-pyromellitimide (PIB-PzEA-Pyromellitimide) obtained by reaction of two equivalents of PIB-PzEA with one equivalents of pyromellitic dianhydride.

Into a 50 mL, 3-neck, round-bottom flask equipped with magnetic stirrer, heating mantle, reflux condenser and Dean-Stark trap, septa, and nitrogen inlet and outlet were charged PIB-PzEA (2.956 g) and tetrahydrofuran (25 mL). To the resulting solution was added 0.5 eq of pyromellitic dianhydride (0.146 g). The mixture was refluxed for 4 h under $N_2$ to form the auric-acid derivative. Tetrahydrofuran was then distilled from the flask under vacuum and replaced with dodecane (25 mL). The resulting solution was heated at 160° C. under $N_2$ for 2 h, and the water of imidization was separated using the Dean-Stark apparatus. Reaction and ring-closure of the imide was confirmed using $^1$H NMR by observing the appearance of a peak at 8.23 ppm associated with the aromatic protons of the pyromellitimide moiety along with the shift of the penultimate methylene protons closest to the imide nitrogen from 2.79 to 3.84 ppm. See FIG. 5. The resulting polymer was then collected by precipitation from hexane into acetone. The number average molecular weight of the final polymer was $4.59 \times 10^3$ g/mol with a polydispersity of 1.10. See FIG. 6.

Example 10: Synthesis of Poly(styrene-alt-(PIB-PzEA-Maleimide))

PIB-PzEA (2.956 g) and tetrahydrofuran (25 mL) were charged into a 50 mL, 2-neck, round-bottom flask equipped with magnetic stirrer, heating mantle, reflux condenser and Dean-Stark trap, septa, and nitrogen inlet and outlet. To the resulting solution was added a poly(styrene-all-maleic anhydride) copolymer (0.11 g) having a molecular weight of 1,600 g/mol and an acid number of 495 mg KOH/g (Sigma Aldrich Co.). The solution was refluxed for 4 h under $N_2$ to form the amic-acid derivative. Tetrahydrofuran was then distilled from the flask under vacuum and replaced with dodecane (10 mL). The resulting solution was heated at 160° C. under $N_2$ for 2 h, and the water of imidization was separated using the Dean-Stark apparatus. The resulting poly(styrene-alt-(PIB-PzEA-maleimide)) was then collected by precipitation from hexane into acetone. Reaction and ring-closure of the imide was confirmed using $^1$H NMR by observing the appearance of a broad peak assigned to the penultimate methylene protons closest to the imide nitrogen, centered at 3.40 ppm. The number average molecular weight of the poly(styrene-alt-(PM-PzEA-maleimide)) was $5.33 \times 10^4$ g/mol with a polydispersity of 1.32.

Example 11: Protection of Diethylenetriamine (DETA)

The primary amine of diethylenetriamine (DETA) was protected by forming a Schiff base with methyl isobutyl ketone. Briefly, diethylenetriamine (3.94 mL, 3.76 g) and methyl isobutyl ketone (50 mL) were charged into a 2 L, three-neck, round-bottom flask equipped with magnetic stirrer, heating mantle, reflux condenser and Dean-Stark trap, septa, and nitrogen inlet and outlet. The resulting solution was heated to reflux under continuous $N_2$ purge. After 4 h, quantitative removal of the water by-product (1.31 mL) was observed indicating quantitative formation of the Schiff base.

Example 12: Reaction of PIB-Br with Protected DETA

Once the formation of the Schiff base above was complete, solid $K_2CO_3$ (7.48 g) and a solution prepared from 7.074 g of PIB-Br and methyl isobutyl ketone (10 mL) was added to the reaction vessel. The solution was allowed to reflux for 4 h, at which point quantitative reaction was observed with the use of $^1$H NMR by monitoring the shift of the methylene protons on the (3-bromopropoxy)benzene moiety from 4.08 to 3.99 ppm.

Example 13: Preparation of Polyisobutylene-Diethylenetriamine (PIB-DETA)

Residual methyl isobutyl ketone was separated from the polymer by precipitation into acetone. Upon recovery, the polymer was solubilized in a 2:1 mixture of tetrahydrofuran (100 mL) and water (50 mL). The solution was heated at 50° C. overnight to allow for quantitative hydrolysis of the Schiff base and release of methyl isobutyl ketone protecting group. Complete deprotection was confirmed through $^1$H NMR by observing the disappearance of characteristic peaks associated with the Schiff base. The resulting polyisobutylene-diethylenetriamine (PIB-DETA) was separated by precipitation from hexane into acetone.

Example 14: Synthesis of PIB-DETA-Phthalimide

Figure 7:
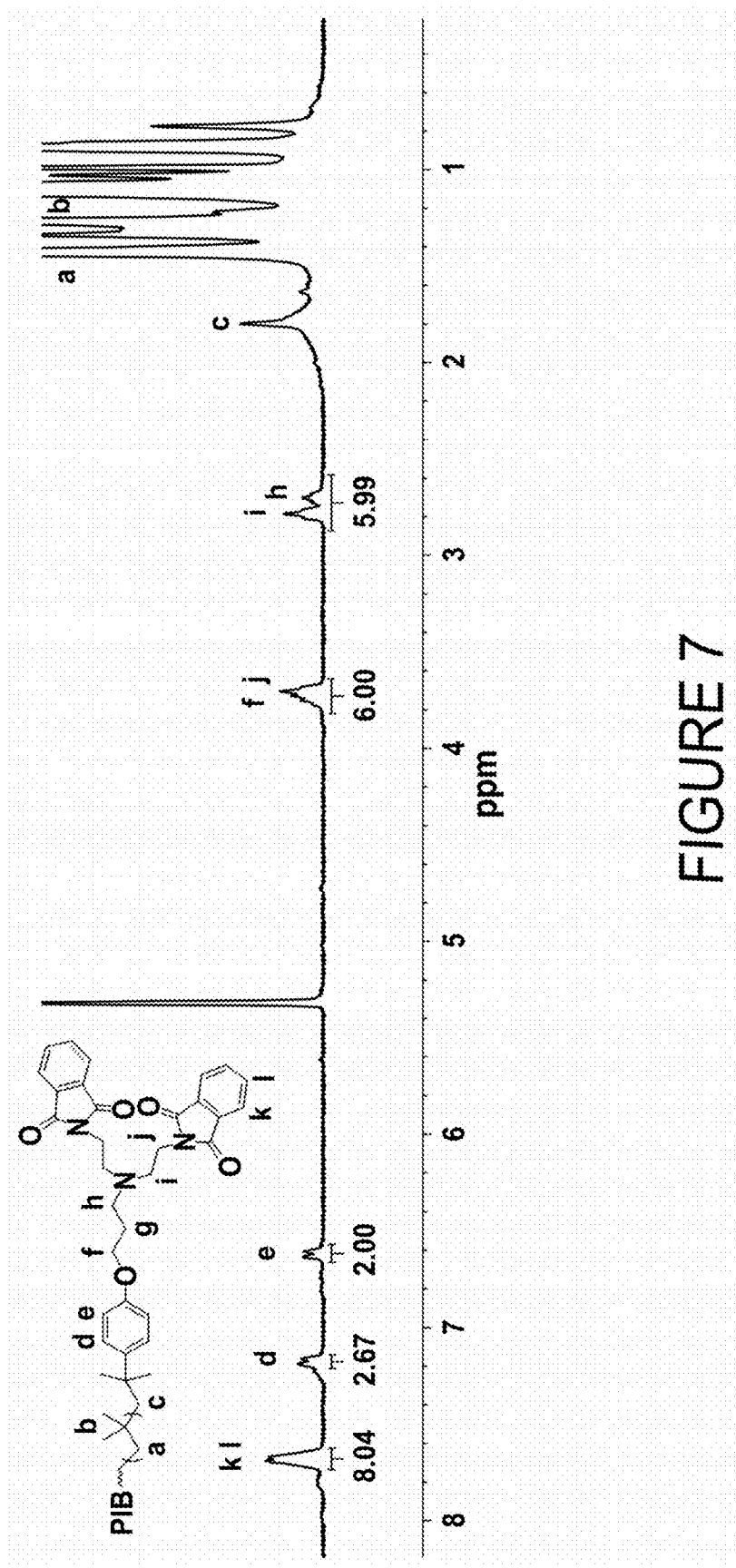
FIG. 7 is the $^1$H NMR spectrum (300 MHz, $CD_2Cl_2$, 22° C.) of polyisobutylene-bis(2-phthalimidoethyl)amine (PIB-DETA-Phthalimide) obtained by reaction of one equivalents of PIB-DETA with at least two equivalents of phthalic anhydride.

PIB-DETA (0.714 g) and 10 mL THF were charged into a 25 mL, three-neck, round-bottom flask equipped with magnetic stirrer, heating mantle, reflux condenser and Dean-Stark trap, septa, and nitrogen inlet and outlet. Stirring was activated, and 3.95 eq of solid phthalic anhydride (0.199 g) was added to the flask. The mixture was refluxed for 4 h under $N_2$ to form the amic-acid derivative. Tetrahydrofuran was then distilled from the flask under vacuum. The resulting polymer was heated at 160° C. under $N_2$ for 2 h, and the water of imidization was separated using the Dean-Stark apparatus. Reaction and ring-closure to form the imide was confirmed using $^1$H NMR by observing the appearance of peaks at 7.73 and 7.65 ppm associated with the phenyl protons of the phthalimide group. The resulting PIB-DETA-Phthalimide was separated from excess phthalic anhydride by precipitation from hexane into acetone. The structure was confirmed by NMR analysis, as shown in FIG. 7.

Synthetic Methodology

As depicted in Scheme 1, a facile and modular synthetic route was developed to access PIB-PzEA and PIB-PzEA-derived dispersants. By way of example, Scheme 1 illustrates the synthesis of polyisobutylene-piperazinylethylamine (PIB-PzEA) followed by subsequent imidization with 1,8-naphthalic anhydride to afford PIB-PzEA-naphthalimide. It is understood that alternative polyolefin dispersants can be prepared simply by varying the polyolefin, quenching agent, polyamine, and anhydrides employed in the modular synthesis.

Example polyamines of interest include 1-(2-aminoethyl) piperazine and diethylenetriamine, which can provide mono- and di-functional dispersants in terms of the number of polar head groups, respectively. Other suitable polyamines include, for example, N-methyl-1,3-diaminopropane, 4-[2-(1-piperazinyl)ethyl]-1-piperazineethanamine, triethylenetetramine (TETA), triethylenepentamine (TEPA), pentaethylenehexamine (PEHA), hexaethyleneheptamine (HEHA), N-phenyl-p-phenylenediamine, and N-benzylethylenediamine. Example anhydrides of interest include, for example, maleic anhydride, phthalic anhydride, and glutaric anhydride. Other suitable anhydrides include, for example, dianhydrides (e.g., pyromellitic dianhydride or naphthalenetetracarboxylic dianhydride) as well as other polycyclic anhydrides (e.g., poly(styrene-all-maleic anhydride)).

Scheme 1. Illustration of the synthetic methodology used to prepare polyisobutylene-piperazinylethylamine (PIB-PzEA) as well as subsequent imidization of PIB-PzEA with 1,8-naphthalic anhydride to form PIB-PzEA-naphthalimide.

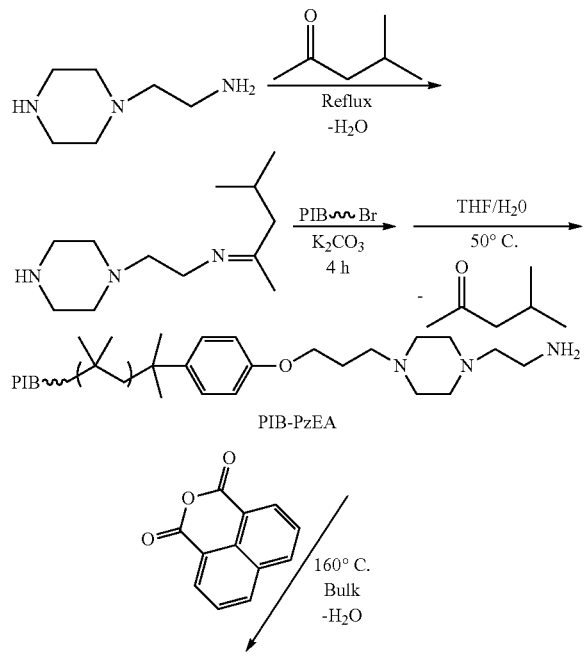

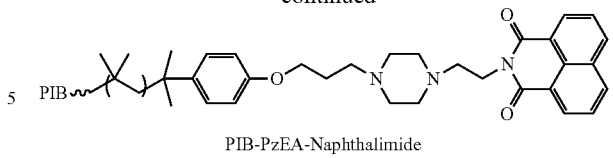

PIB-PzEA-Naphthalimide

Preparation of Dispersants

Example dispersants, polyisobutylene-piperazinylethylamine-glutarimide (PIB-PzEA-Glutarimide), polyisobutylene-piperazinylethylamine-phthalimide (PIB-PzEA-Phthalimide), and polyisobutylene-piperazinylethylamine-naphthalimide (PIB-PzEA-Naphthalimide) were prepared by reaction of PIB-PzEA with suitable anhydrides. The dispersants include one or more tertiary amines and at least a phenyl ring, but lack primary and secondary amines.

Figure 8A:
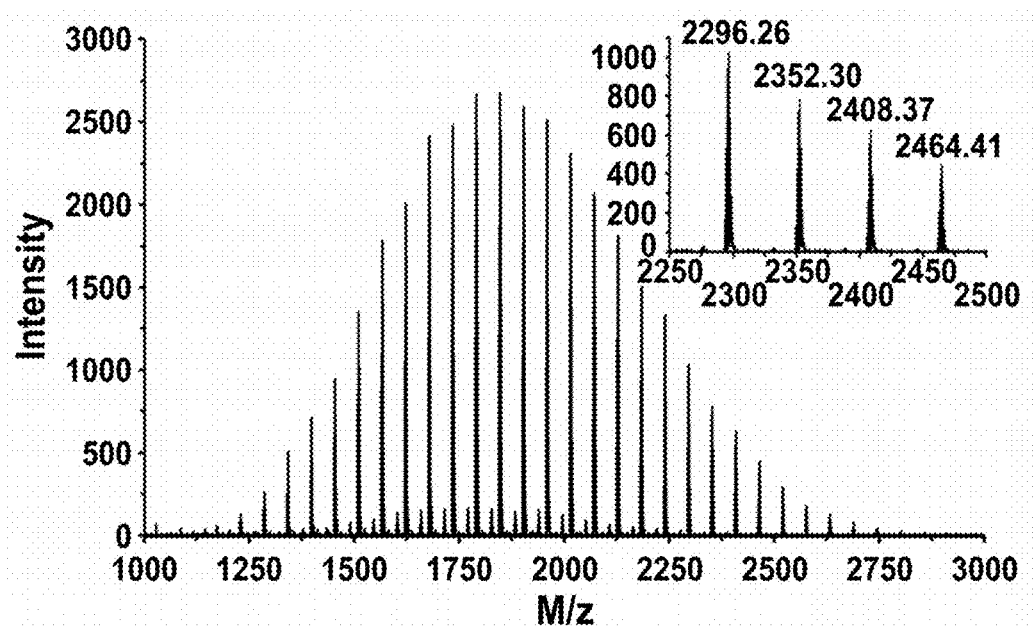
FIG. 8A is a MALDI-TOF mass spectrum of polyisobutylene-piperazinylethylamine (PIB-PzEA) prepared by the dried droplet method using DCTB as the matrix, AgTFA as the cationizing agent, and THF as the solvent.
Figure 8B:
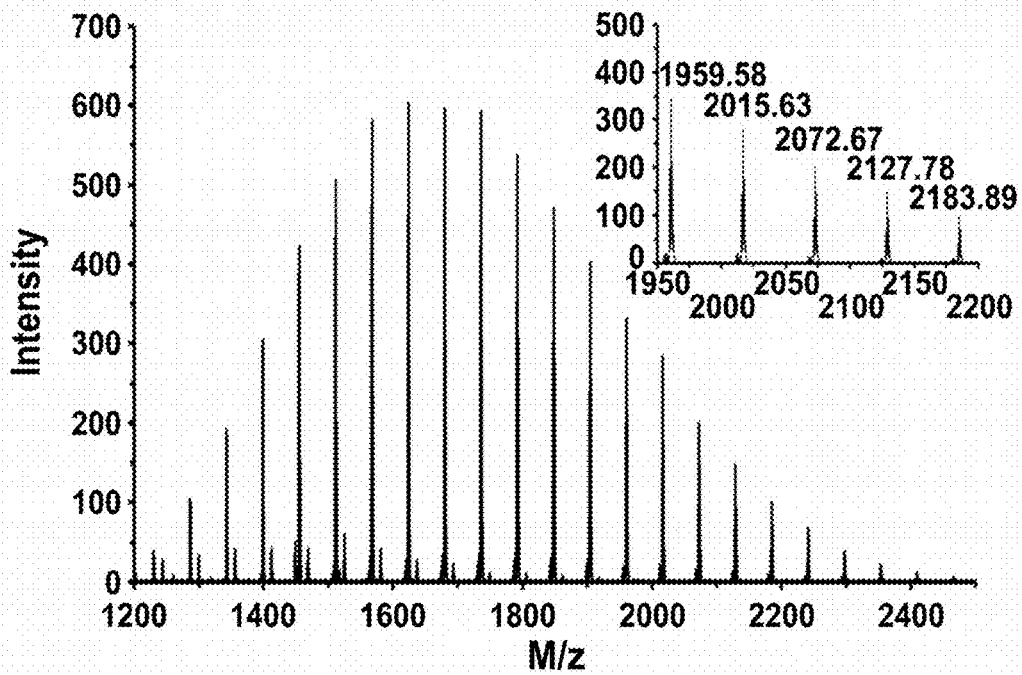
FIG. 8B is a MALDI-TOF mass spectrum of polyisobutylene-piperazinylethylamine-phthalimide (PIB-PzEA-Phthalimide) prepared by the dried droplet method using DCTB as the matrix, AgTFA as the cationizing agent, and THF as the solvent.
Figure 9:
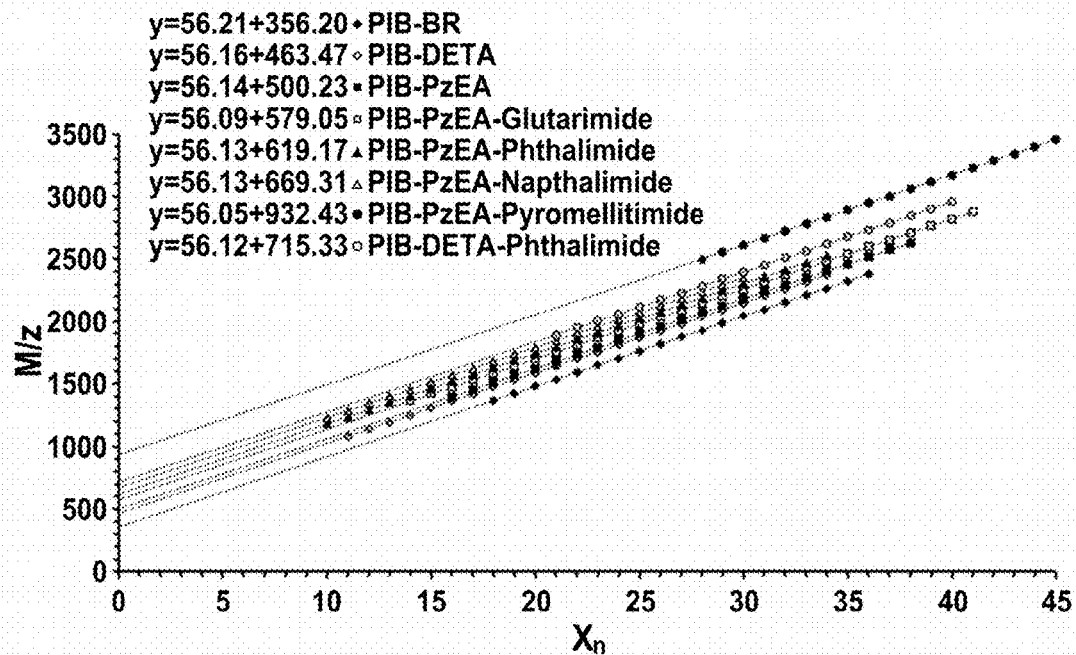
FIG. 9 is a plot of mass-to-charge ratio (M/z), measured at the maximum of each peak of the major distribution, versus degree of polymerization ($X_n$) for PIB-PzEA, PIB-PzEA-Phthalimide, PIB-PzEA-Naphthalimide, PM-PzEA-Pyromellitimide, PIB-PzEA-Glutarimide, PIB-DETA and PIB-DETA-Phthalimide. Best fit lines were obtained using linear regression analysis.

MALDI-TOF mass spectrometry was also used to determine end-group functionality and confirm the structure of PIB-DETA and PIB-PzEA-derived dispersants. The MALDI-TOF mass spectra of PIB-PzEA and PIB-PzEA-Phthalimide, which are representative, are shown in FIGS. 8A and 8B, respectively. Each sample displayed a single, major distribution of polymeric species, associated with either Ag or Na cations from the cationizing agent (AgTFA or NaTFA), differing from each other only by the number of isobutylene repeat units. As shown in FIG. 9, the data from each mass spectra were analyzed by linear regression of a plot of mass-to-charge ratio (M/z, assumed to be 1), measured at the maximum of each peak of the major distribution, versus degree of polymerization (DP). The slope of this plot is theoretically equivalent to the exact mass of the isobutylene repeat unit, 56.06 Da. The y-intercept is theoretically equivalent to EG+I+C, where EG is the exact mass of the PzEA end group, I is the exact mass of the TMPCl initiator residue (113.22 Da), and C is the relative mass of the associated Ag (107.86 Da) or Na (22.99 Da) cation. MALDI-TOF-MS and GPC characterization data of the PIB-DETA and PIB-PzEA-derived dispersants is summarized in Table 1.

TABLE 1

GPC and MALDI-TOF MS Data of PIB-DETA and PIB-PzEA-Derived Dispersants

| Sample | $M_n$ (GPC) | PDI (GPC) | $M_n$ (MALDI) | PDI (MALDI) | EG $MW_{theo}$ | EG $MW_{expt}$ | Diff. | $M_{ru}$ |
|---|---|---|---|---|---|---|---|---|
| PIB-Br | 1,950 | 1.12 | 1,760.05 | 1.02 | 215.09 | 219.99 | 4.90 | 56.21 |
| PIB-PzEA | — | — | 1,921.71 | 1.02 | 279.15 | 279.11 | 0.04 | 56.14 |
| PIB-PzEA-Phthalimide | 2,552 | 1.09 | 1,791.32 | 1.02 | 392.47 | 398.09 | 5.62 | 56.13 |
| PIB-PzEA-Naphthalimide | 2,816 | 1.16 | 1,716.65 | 1.02 | 442.56 | 448.23 | 5.67 | 56.13 |
| PIB-PzEA-Glutarimide | 2,378 | 1.11 | 2,058.26 | 1.02 | 358.45 | 357.97 | 0.48 | 56.09 |
| PIB-PzEA-Pyromellitimide | 4,590 | 1.11 | 3,400.98 | 1.03 | 708.89 | 711.35 | 2.46 | 56.05 |
| PIB-DETA | — | — | 1,695.85 | 1.03 | 236.53 | 242.39 | 5.86 | 56.16 |
| PIB-DETA-Phthalimide | — | — | 2,440.06 | 1.01 | 496.53 | 494.25 | 2.28 | 56.12 |

Figure 10:
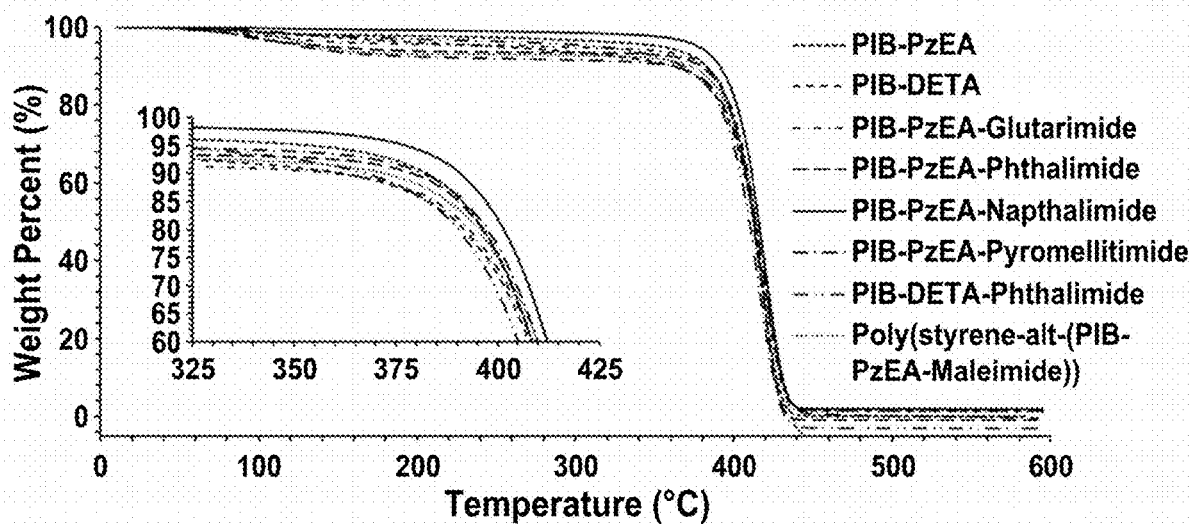
FIG. 10 is a plot of the TGA curves for PIB-PzEA, PIB-PzEA-Phthalimide, PIB-PzEA-Naphthalimide, PIB-PzEA-Pyromellitimide, PIB-PzEA-Glutarimide, PIB-DETA, PIB-DETA-Phthalimide and Poly(styrene-alt-(PIB-PzEA-Maleimide)).

PIB-PzEA and PIB-DETA-derived dispersants were tested for thermal stability by thermogravimetric analysis. See FIG. 10. All dispersants exhibited similar decomposition behavior regardless of end-group structure. Loss of residual hexane is observed at low temperatures upon which a steady plateau is reached. Rapid decomposition occurred once the onset temperature was reached and all dispersants were completely decomposed over a short temperature range of approximately 70° C. The end-group structures of the dispersants comprise 20 wt % or less of the molecular weight and as such, the degradation temperature, and rate of decomposition will be relatively unaffected regardless of the identity of the end-group structure, as summarized in Table 2.

TABLE 2

TGA Data of PIB-DETA and PIB-PzEA-Derived Dispersants

| Sample | $T_d$ (onset)[a] (° C.) | $T_d$ (midpoint)[b] (° C.) |
|---|---|---|
| PIB-PzEA | 373.29 | 412.82 |
| PIB-PzEA-Pyromellitimide | 389.38 | 416.34 |
| PIB-PzEA-Glutarimide | 379.68 | 414.63 |
| PIB-PzEA-Phthalimide | 382.95 | 413.26 |
| PIB-PzEA-Naphthalimide | 380.87 | 416.04 |
| PIB-DETA | 350.47 | 413.45 |
| PIB-DETA-Phthalimide | 355.85 | 410.24 |
| Poly(styrene-alt-(PIB-PzEA-Maleimide)) | 380.14 | 416.20 |

[a]5% weight loss after residual hexane removal,
[b]50% weight loss after residual hexane removal.

Following industry protocols (ASTM D-6594-14, entitled "Standard Test Method for Evaluation of Corrosiveness of Diesel Engine Oil at 135° C.," which is hereby incorporated herein by reference), PIB-PzEA-Phthalimide was tested for its corrosiveness of copper and lead metal. Oil containing PIB-PzEA-Phthalimide showed limited corrosion of copper and lead metal. As detailed in Table 3, the corrosiveness of the lubricating oil containing PIB-PzEA-Phthalimide was within passing standards for both copper and lead corrosion.

TABLE 3

High Temperature Corrosion Test of Oil with PIB-PzEA-Phthalimide

| Metal Type | Oil Test with PIB-PzEA-Phthalimide[a] Change in Concentration (ppm) | Acceptable Limits (ppm) |
|---|---|---|
| Copper (Cu) | 4.0 | <20.0 |
| Lead (Pb) | 35.0 | <120.0 |

[a]Conducted at 6 wt % PIB-PzEA-Phthlimide

Compatibility of PIB-PzEA-Phthalimide with fluroelastomers was evaluated using the compatibility tests described in ASTM D7216-15 (entitled "Standard Test Method for Determining Automotive Engine Oil Compatibility with Typical Seal Elastomers," which is hereby incorporated herein by reference) using DC-AK6 type elastomer. The test results are summarized in Table 4. Minimal changes in mechanical properties were observed and all tests were within passing parameters.

TABLE 4

Mechanical Properties of AK6 Fluoroelastomer After Exposure to PIB-PzEA-Phthalimide

| Testing Method | Oil Test with PIB-PzEA-Phthalimide[a,b] | Acceptable Limits |
|---|---|---|
| Volume Variation (%) | 0.78 | −1/+5 |
| Hardness Variation (Points) | −1 | −1/+5 |
| Tensile Strength Variation (%) | −32.4 | −50/+10 |
| Elongation at Break Variation (%) | −36.2 | −60/+10 |

Figure 11A:
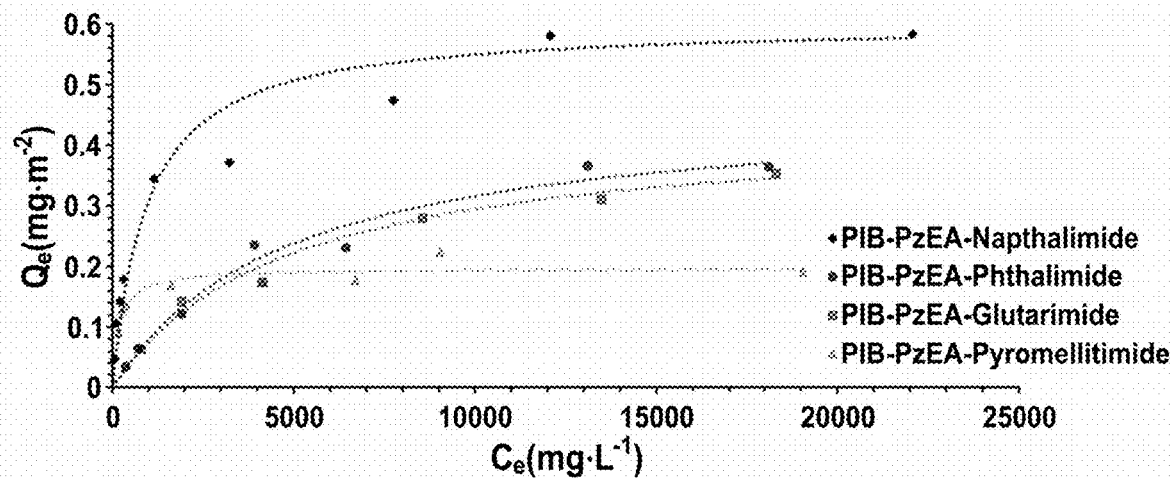
FIGS. 11A and 11B show Langmuir adsorption isotherms for PIB-PzEA-Glutarimide, PIB-PzEA-Phthalimide, PIB-PzEA-Naphthalimide, and PIB-PzEA-Pyromellitimide, plotted on a mass basis (FIG. 11A) and a molar basis (FIG. 11B). The methods used to construct the plots in FIGS. 11A and 11B are described in Ho, Y.-S., et al. Regression Analysis for the Sorption Isotherms of Basic Dyes on Sugarcane Dust. Bioresour. Technol. 2005, 96 (11), 1285-1291, which is hereby incorporated by reference in its entirety.
Figure 11B:
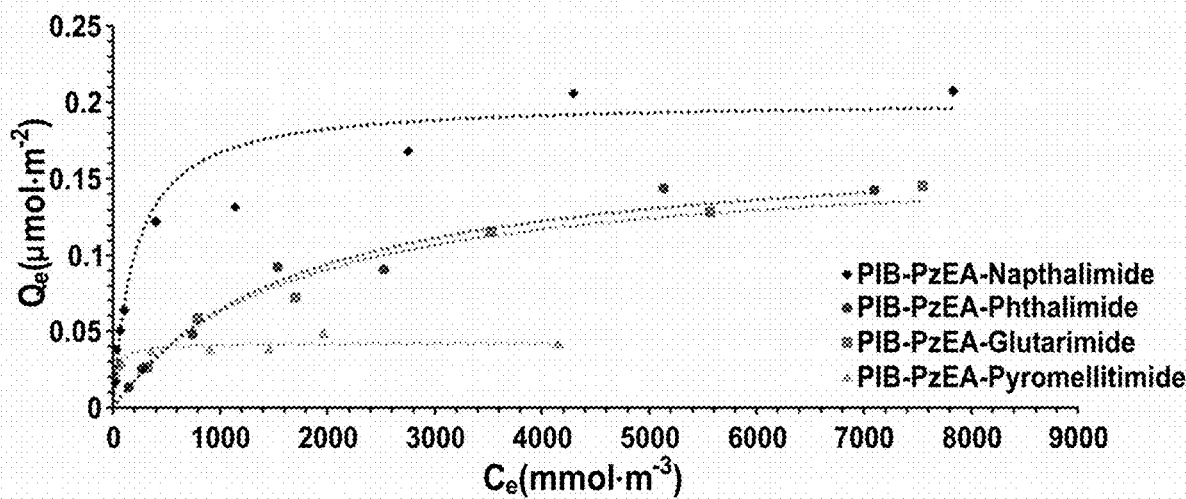
Figure 12A:
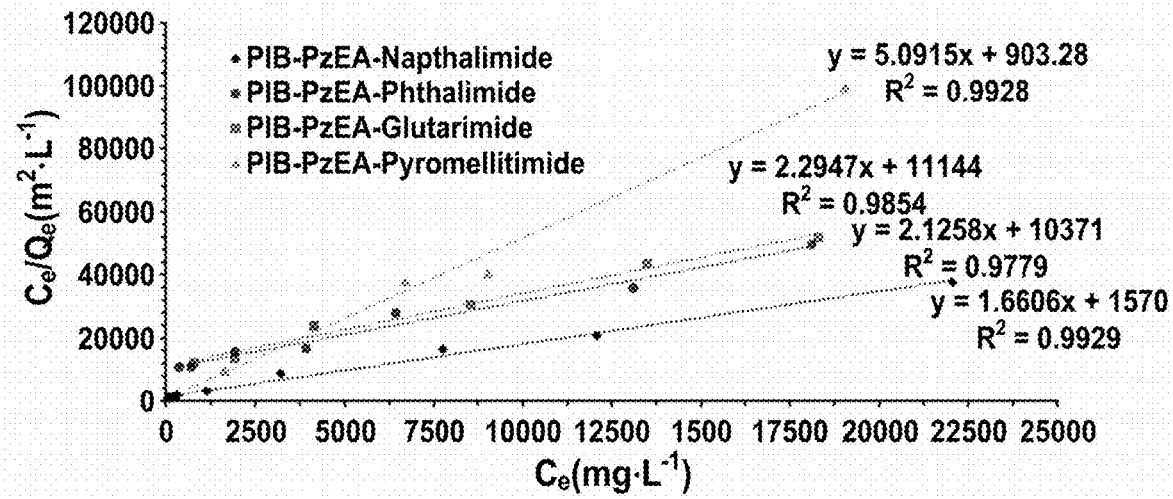
FIGS. 12A and 12B show linearized Langmuir isotherms for PIB-PzEA-Glutarimide, PIB-PzEA-Phthalimide, PIB-PzEA-Naphthalimide and PIB-PzEA-Pyromellitimide, plotted on a mass basis according to Equation 1 (FIG. 12A) and a molar basis according to Equation 2 (FIG. 12B). The methods used to construct the plots in FIGS. 12A and 12B are found in the following reference: Ho, Y.-S.; Chiu, W.-T.; Wang, C.-C. Regression Analysis for the Sorption Isotherms of Basic Dyes on Sugarcane Dust. Bioresour. Technol. 2005, 96 (11), 1285-1291, which is hereby incorporated by reference in its entirety.
Figure 12B:
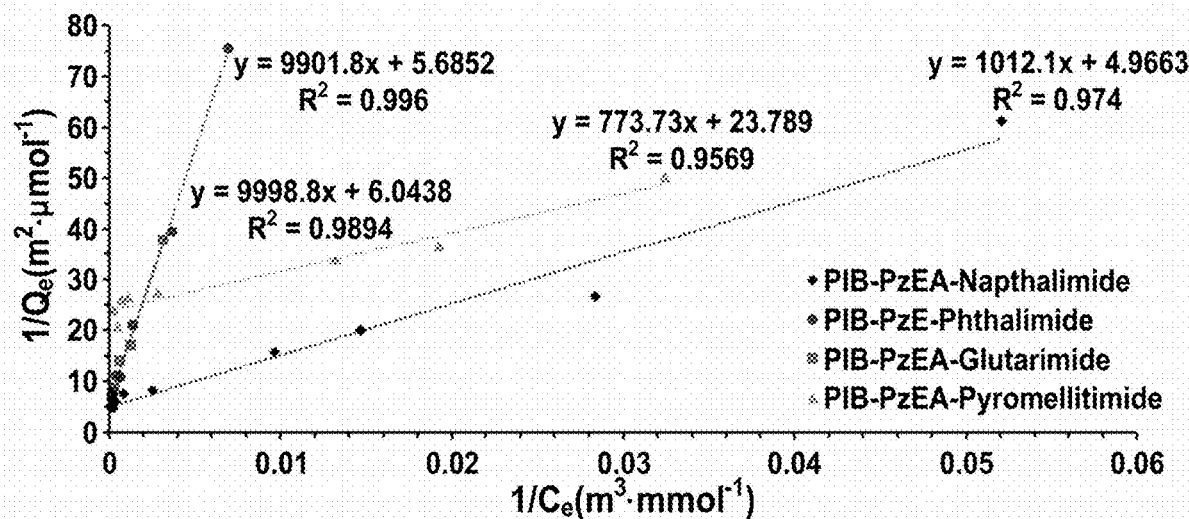

[a]Conducted at 6 wt % PIB-PzEA-Phthalimide,
[b]Test results were an average of three measurements The affinity for adsorption of PIB-PzEA-Glutarimide, PIB-PzEA-Phthalimide, PIB-PzEA-Naphthalimide, and PIB-PzEA-Pyromellitimide onto Vulcan XC-72R carbon black was studied using UV-VIS supernatant depletion assay. Construction of individual calibration curves and subsequent studies were based off UV absorbances observed for PIB-PzEA-Glutarimide (285 nm), PIB-PzEA-Phthalimide (285 nm), PIB-PzEA-Naphthalimide (286 nm) and PIB-PzEA-Pyromellitimide (285 nm) attributed to the aromatic chromophore present in the phenoxy quencher. With the collected data from UV-VIS supernatant depletion assay, Langmuir isotherms were generated and then linearized in the form of two separate equations, $$\frac{C_e}{q_e} = \frac{C_e}{q_m} + \frac{1}{q_m K_a}, \qquad \text{Eq. 1}$$

and, $$\frac{1}{q_e} = \left(\frac{1}{q_m K_a}\right)\frac{1}{C_e} + \frac{1}{q_m}, \qquad \text{Eq. 2}$$

in where $K_a$ is the adsorption equilibrium constant, $q_m$ is the equilibrium concentration of the dispersant for complete monolayer coverage of the carbon black, $C_e$ is the equilibrium concertation of the dispersant remaining in solution after exposure to carbon black, and $q_e$ which represents the adsorbed amount of dispersant onto the carbon black at a given equilibrium concentration. The derived parameters from the separate linearized Langmuir isotherms are detailed in Table 5. Representation of the resulting Langmuir isotherms are shown in FIGS. 11-12.

TABLE 5

Comparison of thermodynamic parameters as determined by Equation 3 and 4 for PIB-PzEA-derived dispersants

| | | Langmuir (Eq. 1) | | | | | Langmuir (Eq. 2) | | | |
|---|---|---|---|---|---|---|---|---|---|---|
| Sample | $r^2$ | $q_m$ (mg · m$^{-2}$) | $q_m$ (μmol · m$^{-2}$) | $K_a \times 10^3$ (L · mg$^{-1}$) | $K_a$ (m$^3$ · mol$^{-1}$) | $r^2$ | $q_m$ (mg · m$^{-2}$) | $q_m$ (μmol · m$^{-2}$) | $K_a \times 10^3$ (L · mg$^{-1}$) | $K_a$ (m$^3$ · mol$^{-1}$) |
| Naphthalimide | 0.993 | 0.602 | 0.214 | 1.058 | 2.978 | 0.974 | 0.567 | 0.201 | 1.743 | 4.907 |
| Phthalimide | 0.978 | 0.470 | 0.184 | 0.205 | 0.523 | 0.996 | 0.449 | 0.175 | 0.225 | 0.574 |
| Glutarimide | 0.985 | 0.436 | 0.180 | 0.206 | 0.499 | 0.989 | 0.401 | 0.165 | 0.249 | 0.604 |
| Pyromellitimide | 0.993 | 0.196 | 0.043 | 5.637 | 25.87 | 0.957 | 0.193 | 0.042 | 6.698 | 30.75 |

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein are used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method for preparing a polyolefin dispersant, the method comprising:
   (a) generating a quasiliving polyolefin in a reversible deactivation-type living polymerization;
   (b) adding to the reversible deactivation-type living polymerization of step (a) a quenching agent defined by Formula V to generate a phenoxy-quenched precursor;

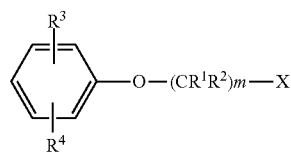

Formula V wherein
   $R^1$ and $R^2$ are each, independently in each —(CR$^1$10 unit, H, alkyl, alkoxy, or alkylaryl;
   $R^3$ and $R^4$ are each, independently, H, alkyl, or alkoxy;
   m is an integer from 1 to 20; and
   X is a leaving group;
   (c) reacting the phenoxy-quenched precursor with a polyamine to form a polyamine-capped precursor; and
   (d) reacting the polyamine-capped precursor with an anhydride to form the polyolefin dispersant.

2. The method of claim 1, wherein step (a) comprises combining a Lewis acid and a monomer with an initiator in the presence of an electron donor, common ion salt, common ion salt precursor, or combination thereof.

3. The method of claim 2, wherein the initiator is chosen from 2-chloro-2,4,4-trimethylpentane, 1,3-bis(2-chloro-2-propyl)-5-tert-butylbenzene, 1,3,5-tri(2-chloro-2-propyl)benzene, 1,3,5-tri(2-methoxy-2-propyl)benzene, and 2,6-dichloro-2,4,4,6-tetramethylheptane.

4. The method of claim 2, wherein the monomer is isobutylene.

5. The method of claim 2, wherein step (b) is performed after high conversion of the monomer has occurred.

6. The method of claim 1, wherein X is chosen from a chloro group, an iodo group, a bromo group, a triflate group, or a mesylate group.

7. The method of claim 1, wherein the polyamine comprises a protected polyamine, and wherein step (c) comprises reacting the phenoxy-quenched precursor with the protected polyamine to form a protected polyamine-capped precursor, and deprotecting the protected polyamine-capped precursor to form the polyamine-capped precursor.

8. The method of claim 1, wherein the polyamine comprises 1-(2-aminoethyl)piperazine, diethylenetriamine, N-methyl-1,3-diaminopropane, triethylenetetramine (TETA), triethylenepentamine (TEPA), pentaethylenehexamine (PEHA), hexaethyleneheptamine (HEHA), N-phenyl-p-phenylenediamine, or N-benzylethylenediamine.

9. The method of claim 1, wherein the anhydride comprises a cyclic anhydride.

10. The method of claim 1, wherein the anhydride comprises a dianhydrides or a polycyclic anhydride.

11. A polyolefin dispersant prepared by the method of claim 1.

12. The method of claim 1, wherein the polyolefin dispersant is defined by Formula I below

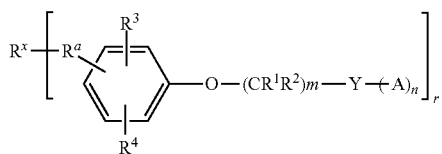

Formula I wherein

R$^x$ is an initiator residue;

R$^a$ is a polyolefin group;

R$^1$ and R$^2$ are each, independently in each —(CR$^1$10 unit, H, alkyl, alkoxy, or alkylaryl;

R$^3$ and R$^4$ are each, independently, H, alkyl, or alkoxy;

m is an integer from 1 to 20;

n is an integer from 1 to 6;

r is an integer from 1 to 4;

Y is a polyvalent amine linker comprising one or more tertiary amines, wherein the polyvalent amine linker does not include a primary amine or a secondary amine; and A is absent, or comprises a dispersive moiety.

13. The method of claim 12, wherein A is present, wherein A comprises an imide moiety.

14. The method of claim 13, wherein the imide moiety comprises a cyclic imide.

15. The method of claim 14, wherein the imide moiety comprises:

a moiety defined by Formula III below

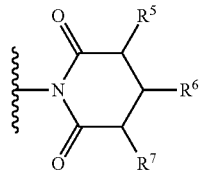

Formula III wherein

R$^5$, R$^6$, and R$^7$ are each, independently, H, halogen, alkyl, alkoxy, aryl, alkylaryl, or cycloalkyl, or wherein R$^5$ and R$^6$, together with the atoms to which they are attached, R$^6$ and R$^7$, together with the atoms to which they are attached, or both R$^5$ and R$^6$ and R$^6$ and R$^7$, together with the atoms to which they are attached, form a 5-8 membered substituted or unsubstituted aromatic or non-aromatic ring; or a moiety defined by Formula IV below

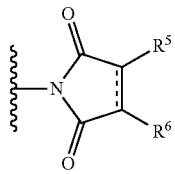

Formula IV wherein

R$^5$ and R$^6$ are each, independently, H, halogen, alkyl, alkoxy, aryl, alkylaryl, or cycloalkyl, or wherein R$^5$ and R$^6$, together with the atoms to which they are attached, form a 5-8 membered substituted or unsubstituted aromatic or non-aromatic ring.

16. The method of claim 15, wherein the imide moiety comprises one of the following

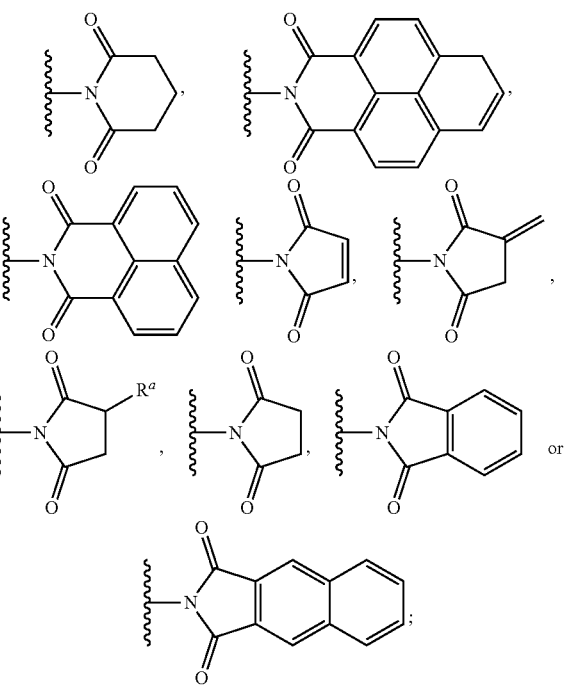

wherein R$^a$ is a polyolefin group.

17. The method of claim 12, wherein R$^a$ comprises a polyisobutylene group.

18. The method of claim 12, wherein Y comprises from one to three tertiary amines.

19. The method of claim 12, wherein Y comprises from 6 to 30 carbon atoms.

20. The method of claim 12, wherein R$^1$ and R$^2$ are each, independently H or alkyl.

* * * * *